Aug. 21, 1951     A. SIMMON     2,565,399
MACHINE FOR MAKING PHOTOGRAPHIC COLOR PRINTS
Filed Sept. 30, 1949     7 Sheets-Sheet 3
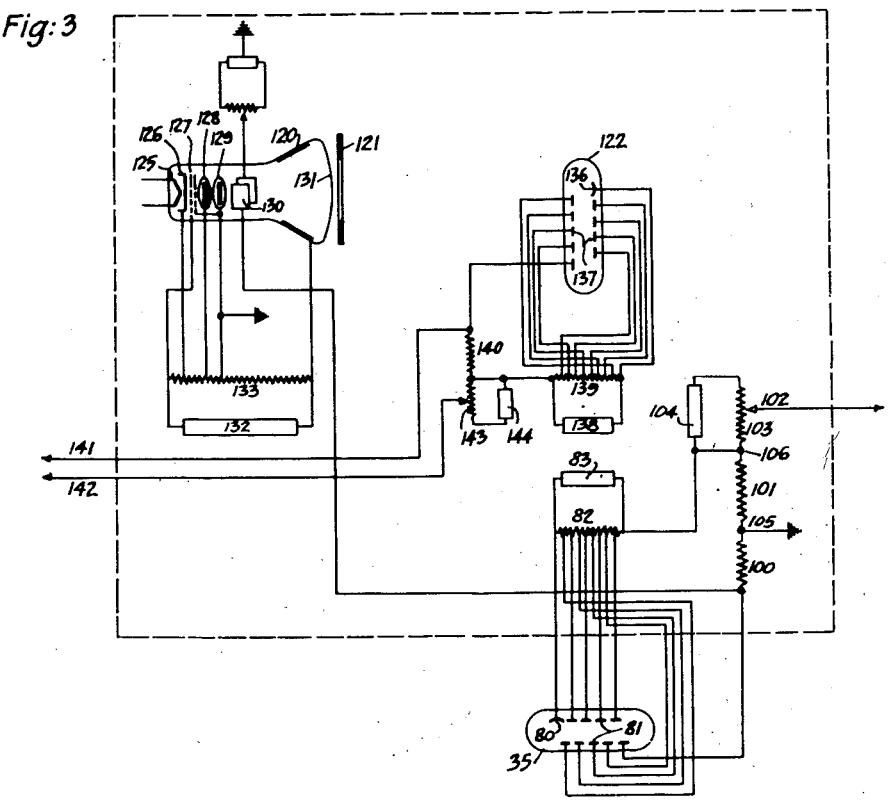
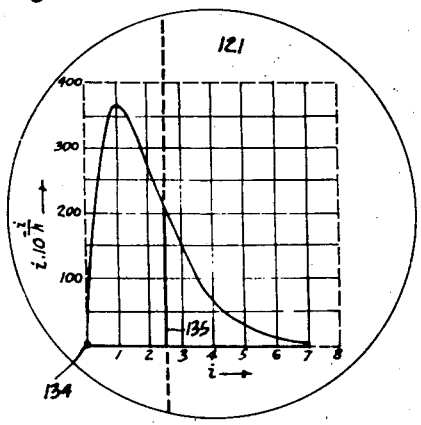
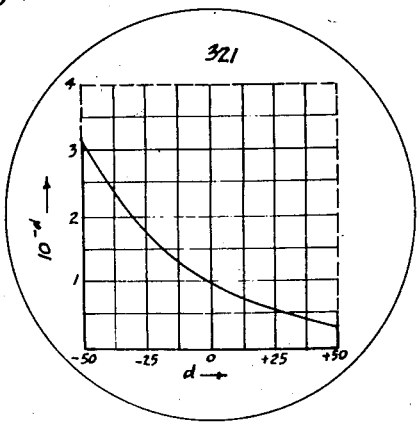
INVENTOR:
Alfred Simmon
BY *Walter E. Wallheim*
ATTORNEY.

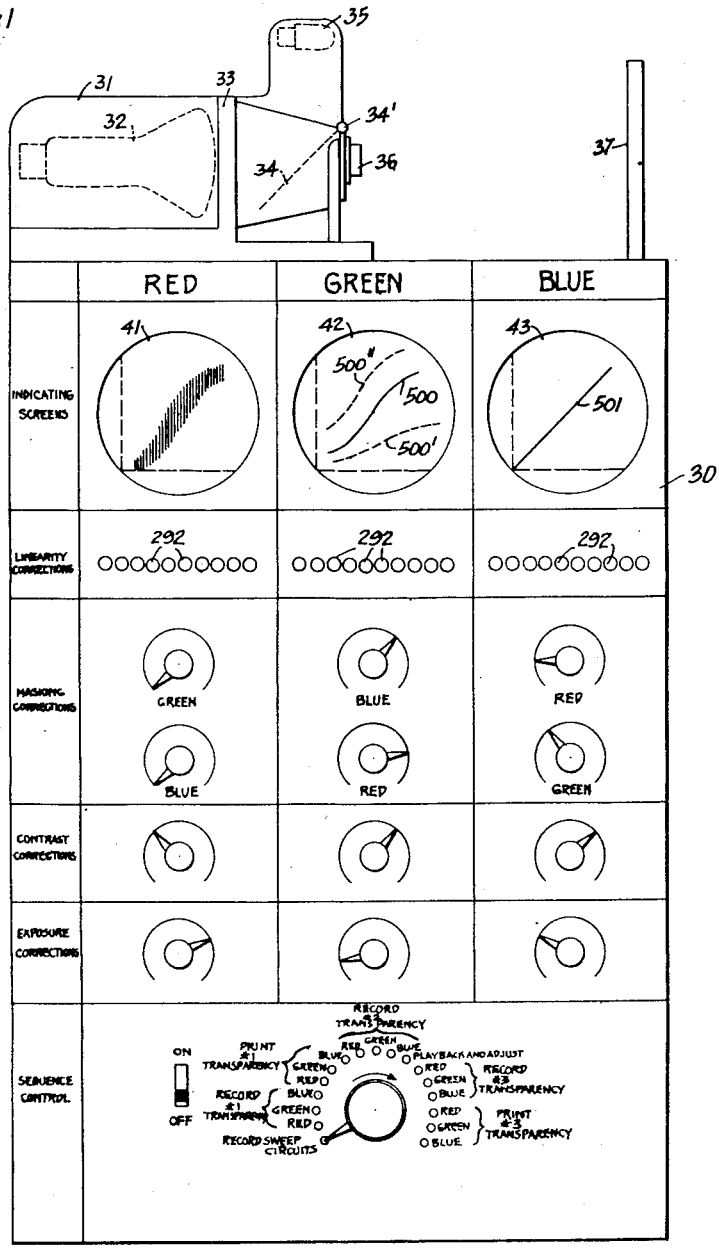

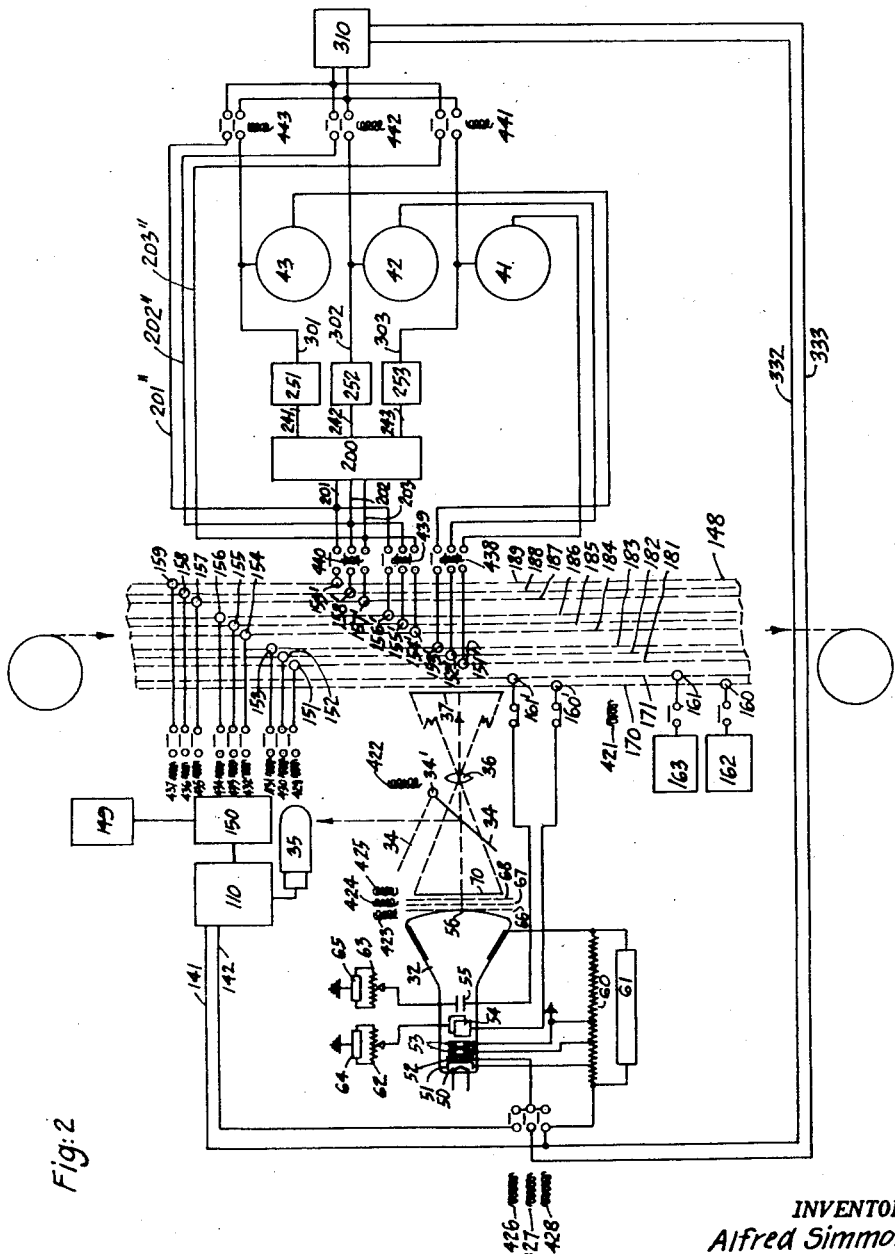

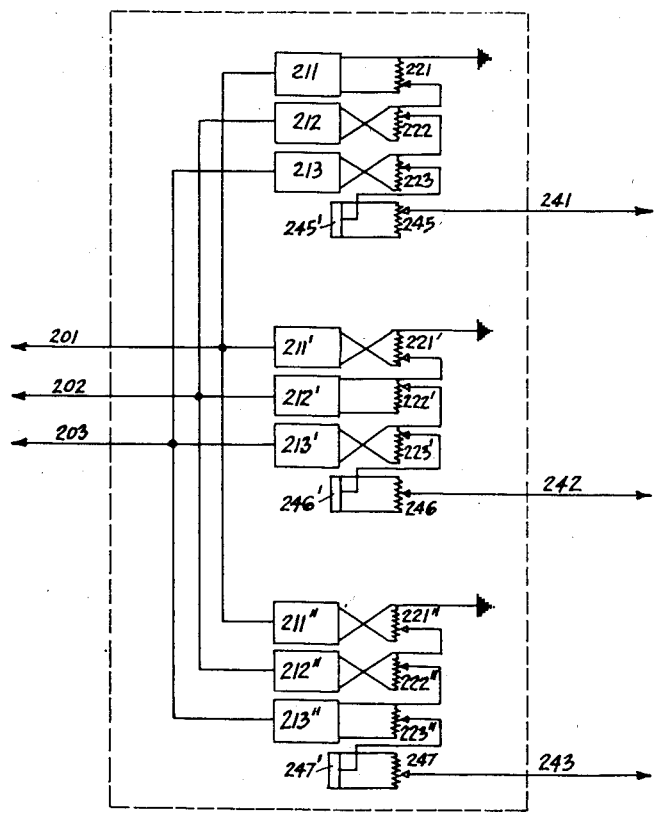
Fig:5

Fig:11
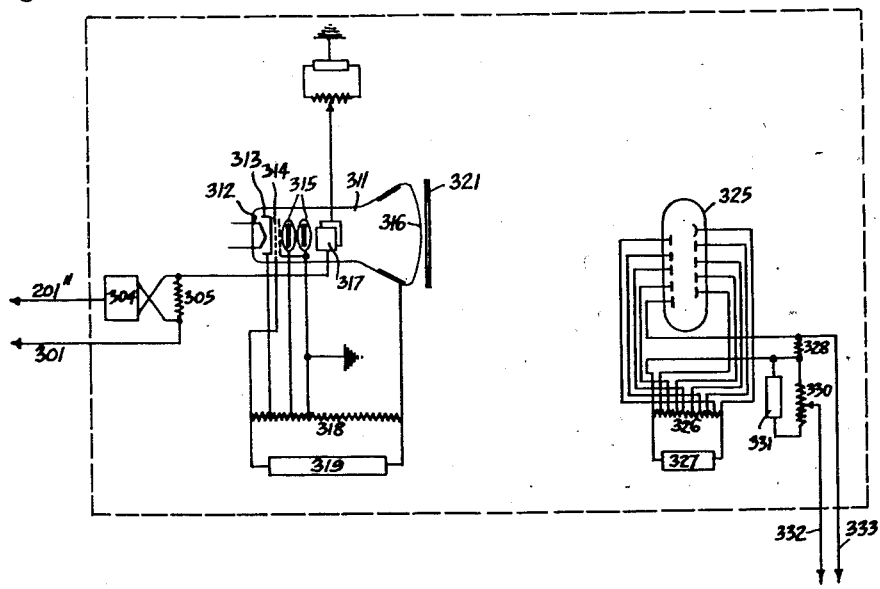
Fig:6
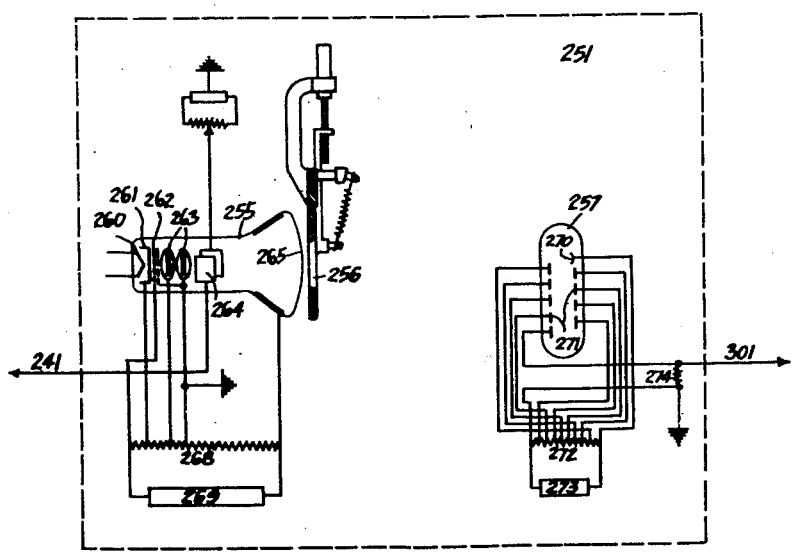
INVENTOR:
Alfred Simmon
BY Walter E. Wollheim
ATTORNEY.

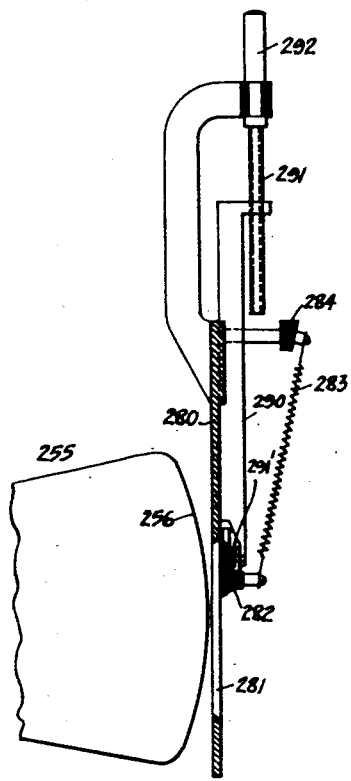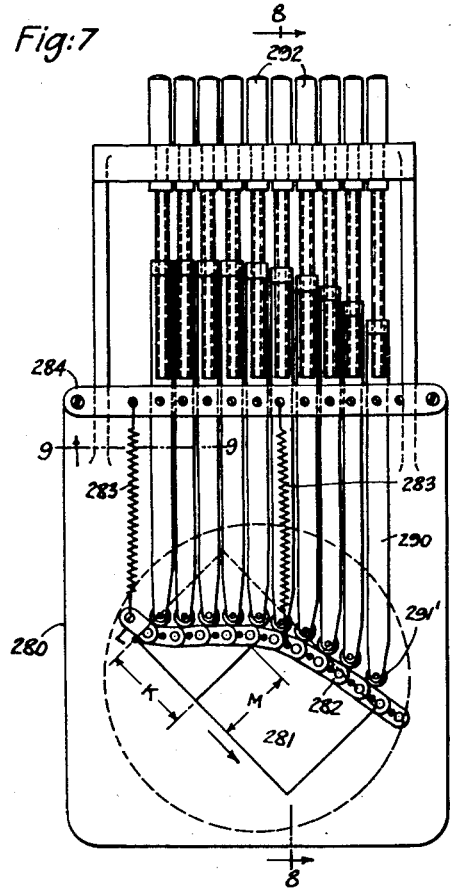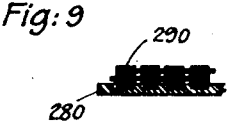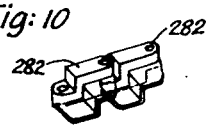

Patented Aug. 21, 1951

2,565,399

UNITED STATES PATENT OFFICE 2,565,399

MACHINE FOR MAKING PHOTOGRAPHIC
COLOR PRINTS

Alfred Simmon, Jackson Heights, N. Y., assignor
to Simmon Brothers, Inc., Long Island City,
N. Y., a corporation of New York Application September 30, 1949, Serial No. 118,768

28 Claims. (Cl. 88—24)

The object of this invention is a machine for making photographic color prints which is applicable to the two main processes known for this purpose which use, respectively three color separation negatives or color transparencies, sometimes called monopack. More particularly it is the object of this invention to devise a machine which permits the correction of the various errors with which color print processes are usually afflicted. These errors may be conveniently placed into four classifications, i. e., errors caused by deficient dyes whereby for example a dye of one "minus" color absorbs light of another color, errors caused by faulty contrast of the separation negatives or of the color transparency, errors caused by faulty exposure of the same, and finally errors caused by the distortion of density values due to the peculiar characteristics of photographic emulsions. To the best of my knowledge this is the first time that a method and a device has been devised which permits this last-named correction.

A preferred embodiment of my invention is illustrated by the appended drawings, of which Fig. 1 shows an external view of the device;

Fig. 2 is a basic circuit diagram;

Fig. 3 shows in more detail a part of this diagram which represents a device to convert photocell currents into voltages representing photographic densities;

Fig. 4 shows a mask with a peculiarly shaped aperture which forms part of the device shown in Fig. 3;

Fig. 5 shows a network by means of which the aforementioned errors caused by deficient dyes, faulty contrast and faulty exposure can be corrected. This network will in the following be briefly called the "masking" network;

Fig. 6 is a device adapted to correct the errors caused by the distortion of contrast values by photographic emulsions. Since these errors may be conceived as departures from the theoretically ideal linear relationship between logarithmic exposure values and photographic densities, this device will, in the following, be called the "linearity corrector";

Fig. 7, 8, 9 and 10 show structural details of an adjustable mask which forms part of the linearity corrector;

Fig. 11 is a circuit of the device which converts voltages representing corrected photographic densities into grid bias voltages for a cathode ray tube;

Fig. 12 is a mask with a peculiarly shaped aperture which forms part of the device shown in Fig. 11;

Like characters of reference denote similar parts throughout the several views and the following specification.

General principle

Figure 13:
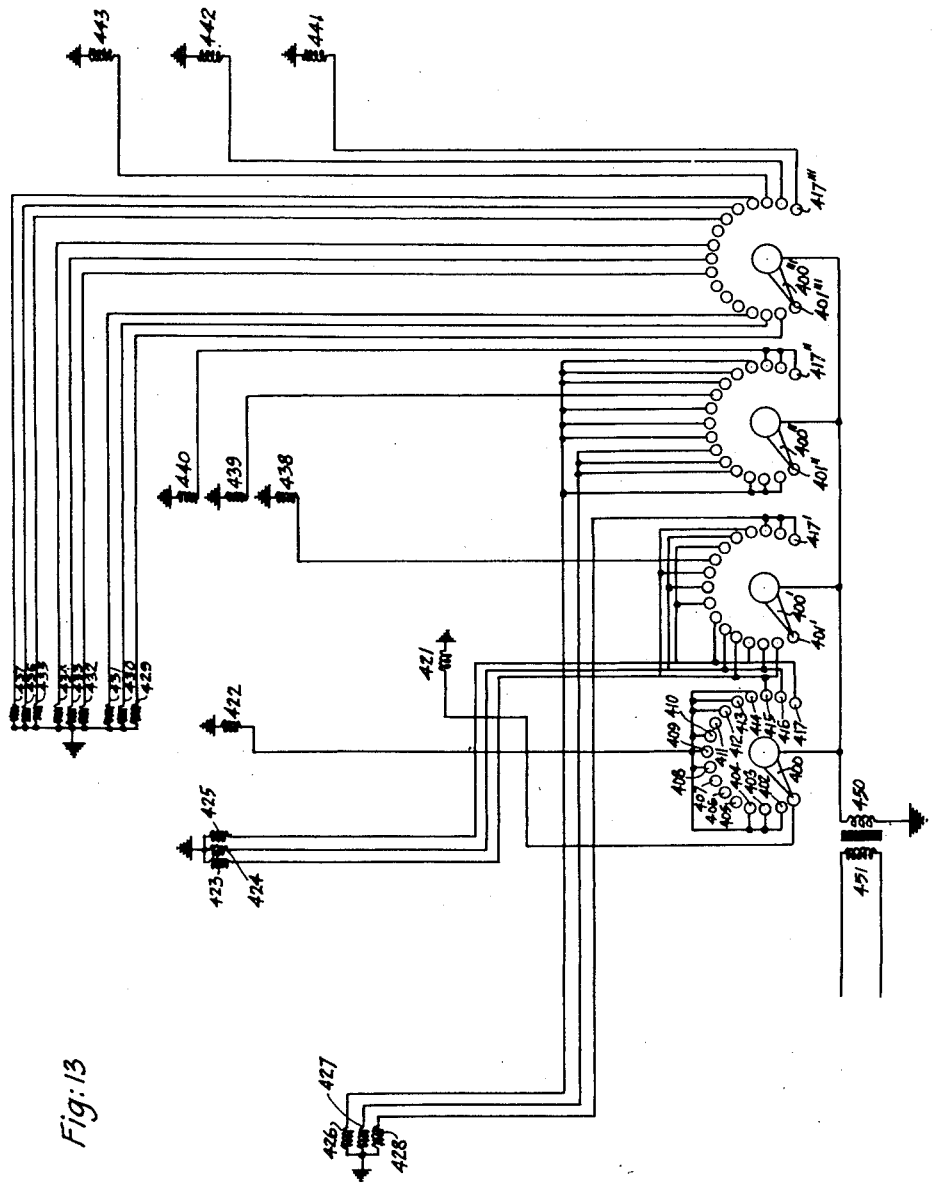
Fig. 13 is a wiring diagram of a control circuit comprising a multiple pole, multiple step switch and a plurality of relays. By means of this circuit the operator causes the machine to perform its various operations in the proper sequence.

The machine consists of the following principal components: A cathode ray tube; means to support either a separation negative or a color transparency in front of this tube; a photo-electric cell; means to support a sensitized sheet upon which a print will be made; means to direct the light emitted by the screen of the cathode ray tube either into this photocell or upon said sensitized sheet, these means usually comprising at least one reflector and, of course, at least one lens between the transparency and the sensitized sheet forming an image of the transparency upon that said sheet; means to convert the currents passing the photocell into voltages proportional to photographic densities; means to record said densities and to repeat that process three times for the three primary colors, respectively; means to play back all recorded densities simultaneously; means to correct said played back densities for the various errors which have been enumerated above; finally, means to convert the voltages representing the corrected densities into grid bias voltages which are in turn impressed upon the grid of the cathode ray tube mentioned at the beginning of this paragraph.

This device is adapted to perform consecutively two distinct and separate operations. During the first operation the light of the cathode ray tube is directed into the photoelecric cell. The currents passing said cell are converted into voltages representing photographic densities and said densities are recorded. During the second operation these densities are played back, are corrected for the various errors with which they are afflicted, converted into grid voltages and fed back into the grid of the cathode ray tube. At the same time the light of this cathode ray tube is now directed upon the sensitized sheet upon which a print with the correct density values may now be made.

Representation of electrical circuits

In the interest of simplicity voltage sources have in the following been represented by batteries, but it will be understood that in reality these batteries can be readily replaced by combinations of transformers, rectifiers and condensers. Linear sweep circuits or saw-tooth wave generators are all shown in block form, since their detailed construction is well known and forms no part of this invention. This is also true of carrier wave generators and the modulating and demodulating circuits associated with them. Again in the interest of simplicity amplifiers have been generally shown in block form only, and it will be understood that amplifiers may be inserted in any place in the system where their presence may appear necessary. Supply circuits for the various filaments for rectifying and cathode ray tubes have been omitted. These filaments are in reality either fed from small batteries or from filament transformers in a well-known manner. All circuits used in this device are extremely sensitive to small voltage fluctuations and, therefore, automatic voltage regulators or stabilizers must be used in order to render all voltages constant in the presence of small change of the line voltage. These stabilizers or voltage regulators have not been shown since their design is well known and since they form no part of this invention. Cathode ray tubes as well as photo-electric cells of the multiplier type require circuits involving multiple tap potentiometers. In the interest of clarity most tubes are shown to be connected to individual potentiometers, and individual batteries associated with the potentiometers, but in practice, it will often be possible to connect several tubes to the same potentiometer and battery. Cathode ray tubes have consistently been shown equipped with electrostatic deflection means, but it will be understood that if so desired electro-magnetic deflection means can be substituted therefor.

Practically all circuits are grounded on one side, so that single wires form the connections between the various units or converters.

A preferred embodiment of this invention comprises a magnetic tape recording means using a relatively wide tape accommodating a plurality of parallel magnetic tracks. This tape and these tracks are indicated schematically by dotted parallel lines. This tape coacts with recording and play-back means which comprise in a known manner iron cores and coils. These recording and play-back means are schematically indicated by circles only. Winding and unwinding means for the tape have not been shown.

Structure and external appearance

Most of the component parts of this machine are housed in a cabinet 30 which is shown in Fig. 1 and which is, preferably, of rectangular shape. The projector 31 is placed on top of this cabinet. This projector contains a cathode ray tube 32, shown in dotted lines, means 33, only schematically shown, to support a color transparency or a separation negative, a rotatable mirror 34, shown in dotted lines, a photo-electric cell 35, and a lens 36. Opposite this lens at a suitable and preferably adjustable distance is a support 37 to which a sheet of sensitized material may be affixed.

All other component parts which will be described in detail later in subsequent paragraphs are housed within cabinet 30. The precise disposition of these parts within this cabinet is of no consequence, and they have, therefore, not been shown, with the exception of the handwheels and dials which I am about to describe.

The front panel of the cabinet is divided into three vertical columns which are labelled, respectively, in accordance with the three primary colors, red, green and blue. Each of these vertical parts represents to the operator all elements necessary to adjust the densities of one particular primary color. These three vertical columns are divided into horizontal parts, each of which contains one of the elements necessary for this purpose.

In the horizontal row are the screens 41, 42 and 43 of three indicating cathode ray tubes which display a luminous pattern by which the degree of color correction achieved by the various controls can be judged. Three typical displays have schematically been shown in Fig. 1. The significance of these displays will be described in detail later.

Below this row of cathode ray tube screens are a relatively large number of small handwheels 292 for the three linearity correctors, respectively. As has been pointed out before, it is the purpose of these linearity correctors to correct the various densities which are distorted by the peculiar and undesirable characteristics of photographic emulsions.

The next two horizontal rows contain six handwheels, two for each primary color, and comprise the "masking" corrections by means of which errors due to deficient dyes can be corrected. Color print processes used in connection with this machine will generally be of the "subtractive" type, i. e., the final print will contain three layers dyed, respectively, with cyan, magenta and yellow dyes. These dyes are sometimes called "minus red," "minus green" and "minus blue." If the dyes were perfect, the cyan dye for example, (minus red) would absorb red light only, i. e., build up densities to red light, but would reflect green and blue. As a matter of fact, it absorbs appreciable quantities of green and blue, or builds up densities to green, and blue light too, which are unwanted. The unwanted green densities can be corrected by the dial marked "green," and unwanted blue densities by the dial marked "blue." Likewise, there are two dials marked "blue" and "red" in the green vertical column and two dials marked "red" and "green" in the blue vertical column, which serve, respectively, the same purpose.

The two next horizontal rows take care, respectively, of the contrast corrections and exposure corrections for the images related to the three primary colors.

Below the control means described up to this point is a large field which is not divided into three vertical columns. This field contains the main "on" and "off" switch and a sequence control comprising a large handwheel which actuates a multiple pole switch with 17 positions. By means of this switch the operator conveniently can control the electrical connections necessary for performing the various operations of the machine in the proper sequence.

Cathode ray tube

The cathode ray tube takes the place of the ordinary illuminating means such as incandescent lamps provided in conventional enlargers. It has been shown as 32 in Fig. 1, and it is shown in more detail in the wiring diagram in Fig. 2. It is a tube of conventional design containing the usual elements: filament 50, indirectly heating cathode 51, grid 52, two focusing members 53, horizontal and vertical deflection plates 54 and 55, respectively, and a screen 56. These elements are connected in the proper sequence to the various points of the potentiometer 60 which receives a suitable voltage from a battery or some other source of voltage 61. The two pairs of deflection plates are connected to two sources of linear sawtooth wave voltages of different frequencies which will be described in detail later. By the coaction of these voltages, and the deflection plates, the luminous spot upon the screen of the cathode ray tube is made to scan the transparency 70 in a televisionlike manner. The starting points of the horiozntal and vertical movement of this spot can be adjusted by two small potentiometers 62 and 63 which are in turn energized by batteries 65 and 65. The grid 52 is connected to a switching arrangement which is formed by three relays shown on the left side of Fig. 2. For some operations the grid will be modulated by a voltage generated by the photocell current-density converter. For some other operations it will be kept constant, and again for some other operations it will be modulated as the output of the density-grid bias converter. All these elements and their function will be described in detail in later paragraphs.

Filters

In one application of the device when color transparencies are used, the screen of the cathode ray tube must have a chemical composition adapted to emit substantially white light and, during operation, one of a set of three filters in the three primary colors, respectively, is disposed immediately in front of this screen. These filters are shown in dotted lines in Fig. 2 as 66, 67 and 68. Only one of these filters, of course, is in the beam of light during operation, the other two having been removed by some suitable movement. For example, they may be pivoted and swung out of the way. These movements may be controlled by hand or, preferably, by three electro-magnets or small motors, 423, 424, 425 which are schematically shown as coils only.

Support for transparency

In front of the screen of the cathode ray tube there are means to support a transparency which may be either a colored transparency or one of a set of separation negatives. This support is shown schematically as 33 in Fig. 2, and the transparency itself is shown also schematically as 70 in Fig. 2. The operation of the device involves the subsequent scanning of more than one transparency showing images of the same patterns or configurations, but of different density values. These density values are later, by means yet to be described, compared with each other, and it is, therefore, necessary to position these transparencies in such a way in front of the screen of the cathode ray tube that corresponding points have the same spatial relationship with respect to this screen. For this reason it is desirable to make the support for the transparency adjustable, and it should preferably be possible to adjust it horizontally, vertically and rotatably. Devices of this type are quite common in machine tool design and are also used on the stage of microscopes, and a mechanism of this character has, therefore, not been shown in detail in the drawings.

As shown, the transparency is positioned immediately in front of the screen. This will ordinarily be the preferred position, since the light emitted by the moving point upon the screen of the cathode ray tube can best be utilized in this manner. However, if desired, the arrangement may be modified and a lens may be placed between the screen 56 and the transparency 70 in such a way that an image of the moving spot is projected into the plane of the transparency 70. The distance between 56 and 70 would, of course, in this case be a great deal larger than shown in Fig. 2.

Photo-electric cell

The photo-electric cell was shown schematically as 35 in Fig. 1, and is again shown in the same manner in Fig. 2. This photo-electric cell may be of any type known in the art but, in practice, I prefer a cell of the so-called photo multiplier tube, since complicated amplifiers can usually be avoided thereby. A tube of this type is shown in detail in Fig. 3 and consists of a photo-sensitive cathode 80 and a plurality, nine in this case, of electrodes 81. These elements are connected to corresponding points of the potentiometer 82 which receives voltage from a battery or the like 83. The photo-sensitive cathode 80 assumes the most negative potential, and the last electrode 81, i. e., the one at the extreme right, receives the most positive potential. The wire connecting this last-named electrode to the extreme right end of potentiometer 82 is interrupted and two resistors 100 and 101 are inserted, the purpose of which will be explained later. The function of a electric multiplier tube is based on secondary emission and is well known, so that a detailed description at this point appears unnecessary.

Support for a sensitized sheet

It is the purpose of this support to receive a sheet of photo-sensitive material usually on a base of paper or the like. This support is shown schematically as 37 in Fig. 1, and would in reality be equipped with spring clips or the like which, however, have been omitted. The distance between the support 37 and the projector, Fig. 1, can preferably be adjusted, so that various magnification ratios may be used.

Means to direct light either into the photo-cell or upon the sensitized sheet The device is adapted to perform consecutively two operations. During the first operation the light is directed into the photo-electric cell and for this purpose a mirror 34 is provided. This mirror is supported by a pivot 34' so that it can be swung out of the way. In the latter case it assumes the position shown in dotted lines in Fig. 2 where it no longer obstructs the path of the light. The movement of the mirror is preferably controlled by a solenoid or small motor 422 shown schematically in Fig. 2. When the mirror is in the position shown in solid lines, the light passing the transparency 70 is reflected at right angles and impinges upon photo-electric cell 35, as shown in Fig. 2. In order to increase the quantity of the light impinging upon the photo-electric cell, it is possible to place light collecting elements between the transparency and the photo-electric cell. These light collecting elements may be, for example, a truncated pyramid, or truncated cones with interior reflecting surfaces.

During the second operation, the light passing the transparency is directed upon the sensitized sheet supported by element 37. Between the transparency 70 and the sensitized sheet, a lens 36 is used which projects a usually enlarged image of the transparency 70 upon the sheet supported by a support 37.

For focusing purposes, the distance between lens 36 and transparency 70 should be adjustable, but no mechanism for this purpose has been shown in the drawings.

*Photocell current-density converter: General principle*

It is the purpose of the photocell density-converter to convert the currents passing the photocell 35, or more precisely the voltage piling up upon the resistor 100, into voltages which are proportional to photographic densities. Broadly, this converter may comprise suitable networks with a non-linear response in such a way that the photocell currents fed into them are proportional to the intensity of the impinging light, and that the currents or voltages delivered by this converter are proportional to the corresponding densities. Many networks with non-linear responses are known comprising, for example, non-linear resistors, vacuum tubes, saturated iron cores and similar elements. Regardless of the detailed design, however, such an arrangement would suffer from the very serious disadvantage that the photocell currents themselves would have to be proportional to light intensities and, if one measures densities up to 3, the light intensities and therewith the photocell currents would vary in the proportion 1:1000. It is very inconvenient, if not impossible, to design circuits which will satisfactorily cover such exceedingly wide range, and I prefer, therefore, to solve the problem in the following manner: The intensity of light impinging any given point of the transparency is modulated in accordance with the transmitted light intensity. This is done by the photocell current itself, and a voltage which is a function of said photocell current is impressed upon the grid 52 of the cathode ray tube, changing its light output. In this manner the fluctuations of the light impinging upon the photo-electric cell 35 are reduced, and it is now even possible to modulate the light intensities in such a manner that the resulting photocell currents become directly proportional to density values.

The converting circuit is shown schematically in block form as 110 in Fig. 2, and in detail in Fig. 3. It will be described in the next two paragraphs.

*Photocell current-density converter: Mathematical basis*

The photocell output current or, more specifically, the voltage impressed upon resistance 100, is fed into the converting circuit. The output voltage of this circuit is then impressed upon the grid of the cathode ray tube and used there to modulate the brightness of the luminous spot formed on the screen. It is, therefore, clear that the converting circuit must deliver an output voltage which is a definite mathematical function of the input current or voltage. This mathematical function will be derived as follows:

The current passing the cathode ray tube can be expressed within certain limits by the formula $$I = I_{max} - ae \quad (1)$$

$I$ is the current passing the cathode ray tube at any given instance, and $I_{max}$ is the maximum permissible cathode ray tube current. This value may be determined either as the maximum current that the screen of the tube will withstand without deterioration, or it may be the maximum value for which the linear relationship between cathode ray tube current and grid bias still holds true, or it may be determined by any other convenient consideration. Both $I$ and $I_{max}$ are conveniently expressed in microamps. ($\mu A$). $e$ is the additional negative voltage impressed upon the control grid 52 which is added to the voltage impressed upon these grids by the left end of potentiometer 60. In other words, the left end of potentiometer 60 imposes a certain constant minimum negative voltage upon the grid at all times, and the voltage $e$ which is the output voltage of the converting circuit will be added thereto. $e$ is expressed in volts. $a$ is a constant which depends upon the characteristics of the individual cathode ray tube and which has a dimension $$\frac{\mu A.}{volts}$$

The light intensity on screen 56, i. e., before the light has passed the transparency, is again within reasonable limits directly proportional to the cathode ray tube current or $$L_1 = bI \quad (2)$$

$L_1$ is expressed in foot candles, or any corresponding metric dimension, and $b$ is a constant again depending upon the characteristic of the cathode ray tube, measured in $$\frac{foot\ candles}{A.}$$

The light intensity, after the light has passed the transparency, is expressed by $$L_2 = L_1 \cdot 10^{-D} \quad (3)$$

where D is the density of the transparency at the point which, at any given distance, is illuminated by the luminous spot of the cathode ray tube.

The light intensity in the plane of the photosensitive cathode of the photo-electric cell 35 is proportional to $L_2$, but, of course, considerably smaller depending upon the distance between the two tubes.

$$L_3 = dL_2 \quad (4)$$

$d$ is a dimensionless constant.

The photocell current is again within wide limits proportional to the light impinging upon the photo-electric cell or $$i = fL_3 \quad (5)$$

where $f$ is a constant denoting the light sensitivity of the photo-electric cell in $$\frac{\mu A.}{foot\ candles}$$

I shall now impose the condition that the converting circuit shall deliver $e$ as a function of $i$, i. e., output voltage, as a function of input current, in such a way that differences of photocell currents shall become directly proportional to density differences of the transparency to be measured, or $$i_1 - i_2 = h(D_2 - D_1) \quad (6)$$

$h$ is a proportionality factor which has the dimension of a current and which is expressed in $\mu A$. $D_1$ and $D_2$ are the photographic densities of two points of the specimen, and $i_1$ and $i_2$ are the corresponding photocell currents, i. e., the currents which are measured when the luminous spot of the cathode ray tube is placed, respectively, behind the two points with the two densities $D_1$ and $D_2$.

Equations 1, 2, 3, 4 and 5 can be combined and solved with the following result $$D = \log \frac{bdf}{i}(I_{max} - ae) \qquad (7)$$

For $D=D_1$, there is, of course, $i=i_1$ and $e=e_1$ and likewise for $D=D_2$, there is, of course $i=i_2$ and $e=e_2$. By substituting these values, I arrive at the following expression for $D_2-D_1$:

$$D_2 - D_1 = \log\left(\frac{I_{max}-ae_2}{i_2}\right) - \log\left(\frac{I_{max}-ae_1}{i_1}\right) \qquad (8)$$

$D_2-D_1$ can also be computed from Equation 6:

$$D_2 - D_1 = \frac{i_1 - i_2}{h} \qquad (9)$$

In the two Equations 8 and 9, $e_2$ becomes zero, and $i_2$ becomes $i_{min}$ for $D_2=\Delta_{max}$, where $\Delta_{max}$ is the highest density within the measuring range of the device. $\Delta_{max}$ usually need not exceed the value 3.

$$\Delta_{max} - D_1 = \log\frac{(I_{max})}{i_{min}} - \log\left(\frac{I_{max}-ae_1}{i_1}\right) \qquad (8a)$$

$$\Delta_{max} - D_1 = \frac{i_1 - i_{min}}{h} \qquad (9a)$$

These two equations can be combined and solved for $e_1$ with the following results:

$$e_1 = \frac{I_{max}}{a}\left(1 - \frac{i_1 \cdot 10^{\frac{-i_1}{h}}}{i_{min} \cdot 10^{\frac{-i_{min}}{h}}}\right) \qquad (10)$$

This is the mathematical function according to which the converting circuit must work, i. e., when the spot of a cathode ray tube passes a point with the density $D_1$, a photocell current $i_1$ will be generated which, by the converting circuit, will be changed into a voltage $e_1$ which is then impressed, in addition to a constant negative bias, upon the control grid of the cathode ray tube.

It is expedient to segregate the two terms of which $e_1$ consists and to design the converting circuit merely for the second term which alone is a function of $i_1$. In other words, $e_1$ consists of the constant term $$\frac{I_{max}}{a}$$

and a variable term $$e_1' = \frac{I_{max}}{a} \cdot \frac{i_{min} \cdot 10^{\frac{-i_1}{h}}}{i_{min} \cdot 10^{\frac{-i_{min}}{h}}} \qquad (10')$$

The converting circuit will be designed for $e'_1$, and the constant term can easily be taken care of by adding a constant source of voltage of the proper polarity to the circuit.

The value $i_{min}$ which appears in Formulae 10 and 10' is the minimum current which will pass the photocell when the density of a point illuminated by the cathode ray tube spot becomes $\Delta_{max}$, which is the maximum density which the device shall be capable of measuring and which rarely, if ever, needs to exceed the value of 3. $i_{min}$ can be computed from the Formulae 1 to 5 by substituting $\Delta_{max}$ for $D$ and by making $e_1$ zero, i.e., $$i_{min} = bdfI_{max} \cdot 10^{-\Delta_{max}} \qquad (11)$$

Of ultimate interest, however, are not density differences, but absolute values of densities, and these are obtained from a network which comprises a resistor 101 carrying the photocell current of cell 35 and which is in series with potentiometer 103 receiving, in turn, a voltage from a battery or other source of voltage 104. The connection of the battery must be so chosen that the polarity of potentiometer 103 is opposed to that of resistor 101 or, in other words, the voltage between the sliding contact 102 of the potentiometer and point 105 is the difference of the respective voltage impressed upon 103 and 101. The function of this network can be explained as follows:

Assuming that the resistance of 101 is R, and that the voltages corresponding to photocell currents $i_1$, $i_2$ are $E_1$ and $E_2$, Equation 6 can be transformed to read:

$$E_1 - E_2 = -hR(D_1 - D_2)$$

For $D_1=0$, $E_1$ will become $E_{max}$, so that we have $$E_{max} - E_2 = +hRD_2$$

This means that if I impress a voltage equal to $E_{max}$ between points 102 and 106 which is opposed to the voltage impressed upon 101, that then the voltage between points 102 and 105 is directly proportional to the density $D_2$ of that point which at any given distance is illuminated by the scanning beam of the cathode ray tube 32.

If one has a transparent specimen, such as presupposed up to this time, the adjustment of the sliding contact 102 of potentiometer 103 is particularly easy because all one has to do is to remove the transparency altogether so that one has zero density, and then adjust sliding contact 102 until the voltage between points 102 and 105 becomes zero.

*Photocell current-density converter: Preferred design*

The design of the converting circuit itself is basically of no importance and any circuit which will convert input current into output voltage according to Formulae 10 or 10' will be satisfactory. A preferred converting circuit, however, will be described in the following:

A converting circuit built accordingly consists of three principal parts, cathode ray tube 120, stationary mask 121 and photo-electric cell 122, see Fig. 3. It is emphasized that the cathode ray tube 120 and the photo-electric cell 122 are in no way identical with elements 32 and 35 which have been described above. They are entirely independent therefrom and perform entirely different functions.

The broad principle of the converting circuit is that in some suitable manner a luminous line is formed on the screen of the second cathode ray tube 120, that the incoming signal which in this case is the current passing the first photocell 35 is used to deflect this line in a direction at right angles to itself and that, thereby, part of the light emitted by this line is cut off by the stationary masks placed in front of the luminous screen of tube 120. The light permitted to pass these masks is then made to impinge upon the second photo-electric cell 122 forming part of the converting circuit, but not upon tube 35. The current passing this second photo-electric cell 122 or, more precisely, the corresponding voltage impressed upon a resistor of suitable magnitude, is then supplied as additional bias to the control grid 52 of the original cathode ray tube 32 which scans the transparency in the manner described.

These circuits are shown in detail in Fig. 3. The cathode ray tube 120 contains filament 125, cathode 126 heated thereby, control grid 127, two focusing members 128 and 129 including a second control grid, one pair of deflection plates 130, and a screen 131 capable of light emittance.

The luminous line can be formed upon this screen by any desired means, for example, by giving the focusing elements 128 and 129 a proper configuration. It would also be possible to use a conventional cathode ray tube with two pairs of deflecting elements and for a luminous spot upon its screen which is, in turn, transformed into a luminous line by means of a separate sweep circuit of high frequency. In this case, a filter of proper electrical dimensions must be added to the photocell circuit to avoid the output signal of the converter being modulated accordingly.

The rest of the supply circuit for the second cathode ray tube is conventional. It consists of a battery 132 and a potentiometer 133, the various points of which are connected to the elements within the cathode ray tubes in such a way that the control grid 127 assumes a fixed negative potential with respect to the cathode 126, but that 128 has a positive potential with respect to 126, 129 a positive potential with respect to 128, and the screen finally a positive potential with respect to 129.

In front of the screen and, preferably, immediately adjacent thereto is mask 121 which is again shown in Fig. 4. This mask has an aperture which directly represents the mathematical function expressed in Formula 10'. The mask is a thin plate made of opaque material, such as black paper or sheet metal, and its vertical width varies as a function of the horizontal distance from a point of reference 136 in accordance with Formula 10'. For convenience, the lower borderline of this aperture is made a straight line, but this is not necessary and both the upper and lower borders may be curved as long as the vertical width of the aperture is the desired function of the horizontal distance from the point of reference 134. It can be seen that only that part of the light emitted by a luminous line 135 behind said aperture can pass and that the other parts which are shown in dotted lines above and below this portion are blocked off. The light impinging upon the second photo-electric cell 122 is, therefore, proportional to the length of that portion of line 135 which appears behind the aperture or is a direct function of the shape of said aperture, in other words, varies in accordance with Formula 10', provided the aperture is fabricated correctly.

The respective distance between photo-electric cell 122 and the cathode ray tube 120 must, of course, be large enough so that all points of the luminous line have substantially the same distance from the photo-sensitive cathode of the photo-electric cell 122. This cell may again be of any desired design and I have again shown a photo-electric multiplier tube because then complicated amplifiers can be avoided. It again has a photo-sensitive cathode 136, and nine additional electrodes 137. The supply circuit comprises a battery 138 and a potentiometer 139, the various points of which are in the usual manner connected, respectively, to elements 136 and 137. The wire between the extreme left point of the potentiometer 139 and the last electrode 137 is again interrupted to receive a resistance element 140. The voltage impressed upon this resistance element by the current passing it represents directly the value $e_1'$ used in Formula 10'. $e_1'$ is then by means of two wires 141 and 142 fed back into the grid control of the first cathode ray tube 32, i. e., voltage $e_1'$ is deducted from the constant negative bias which control grid 52 has with respect to cathode 51.

The circuit described up to this point takes care of the term $e_1'$ as expressed in the Formula 10'. The constant term $$\frac{I_{max}}{a}$$

will be added thereto by a potentiometer 143 which receives its voltage by a separate battery 144. The polarity of the elements must be so chosen that the voltage impressed upon resistor 140 is deducted from the constant negative bias impressed upon grid 52 by the left end of the potentiometer 60. The constant voltage of potentiometer 143, however, must be of a polarity opposite to that impressed upon resistor 140, i. e., the voltage of potentiometer 143 is added to the negative bias delivered by the left end of potentiometer 60.

*Density recording device*

The output of the photocell current-density converter or, more specifically, the voltage between points 105 and 102, Fig. 3, is fed into a suitable recording device. For each color transparency, or for each set of separation negatives, this is done three times in succession, so that densities for the three primary colors are recorded. As will be seen later, it is desirable to provide additional channels in the recording device so that the densities to light of three primary colors of more than one transparency can be recorded consecutively and later played back simultaneously.

This recording device may be of any convenient design. It can, for example, be a mechanical device similar to a phonograph, or it may be a light-sensitive film forming a record somewhat in the manner of a sound track. As the most convenient method I prefer to use a so-called magnetic wire or a magnetic tape recording device, i. e., a device which comprises a ribbon of magnetizable material which, during recording, is moved past a magnetizing device and which can be played back by moving it in a similar manner past a magnetic pick-up. The ribbon is wide enough to accommodate a plurality of magnetic tracks, and is during operation, moved from one storage reel to another.

This ribbon is shown schematically in the diagram of Fig. 2 by eleven dotted lines representing, respectively, eleven different recording channels. The magnetic assemblies which serve as recording or pick-up heads, respectively, are merely shown schematically as circles in Fig. 2. For more detailed information on the design of recording devices in general and magnetic recording devices in particular, I refer to the existing literature, for example, Elements of Sound Recording by Frayne and Wolfe, John Wiley and Son, New York, 1949.

In a known manner the speed with which the ribbon is moved is kept constant, for example, by the use of a synchronous motor and, if desired, automatic reversing means for the reels may be incorporated so that a substantially continuously play is obtained. Generally, amplifiers of suitable design are used both during recording and during the play-back cycle which, however, I have not indicated in detail in Fig. 2. The exact construction of this recording machine as used for the present invention is not important, and it has been shown in Fig. 2 merely schematically.

The signal to be recorded contains a D. C. component which cannot be neglected, and the device differs in this respect from sound recording means. That the recording of the D. C. component is necessary becomes clear by considering that otherwise areas of uniform density, whether they be black, gray or white, would not register on the recording means and could, therefore, later not be reproduced.

Since magnetic recording is inherently incapable of recording a D. C. component, a carrier frequency is used which is high compared to the frequency of the A. C. component of the signal. The carrier frequency is modulatedf in accordance with the incoming signal, and in a similar manner during the play-back cycle the obtained signal is demodulated before it is fed into the rest of the circuit. Modulating and demodulating devices of this type are well known in radio practice and are, therefore, only shown schematically in block form in Fig. 2.

The carrier frequency generator is shown as 149, and the modulating unit is 150. The magnetic ribbon upon which the records are made is 148. It contains nine parallel magnetic tracks 181 to 189 which are adapted to record densities, and two additional tracks 170 and 171 which will be used to record sweep circuit voltages, as will be explained later. The first-named nine magnetic tracks represent three sets of recording channels for three transparencies or three sets of separation negatives for the three primary colors, red, green and blue, respectively. The first two sets of three channels will be used to record the densities of two test specimens, in order to adjust the working constants of the device. The last set of three channels will then be used to record the densities of a transparency representing an actual scene and resulting eventually in an actual print.

Each of the magnetic tracks is moved past a recording head and a pick-up head. The recording heads for the density recording channels are designated 151 to 159, and the two recording heads for the two sweep circuit voltages 160 and 161. Likewise, the pick-up heads related to the respective channels are designated 151' to 159' and 160' and 161'.

Between the photocell current-density converter and the recording medium, there are a number of relays, each equipped with a single pole normally open contact. By the control circuit which will be described later, one of these contacts is closed and the entire assembly serves as a selector switch by which the density to be recorded can be fed into a selected one of a plurality of recording channels. Likewise, a number of relays or, more specifically, three triple pole relays, are inserted into the connections between the play-back heads 151' to 159' and the network which later performs the various corrections.

*Means to coordinate records*

The magnetic ribbon 148 is wide enough to accommodate nine parallel magnetic tracks which serve the purpose of recording the densities to three primary colors, respectively, of three color transparencies or of three sets of separation negatives. These records are made consecutively, one at a time, but as many as six of them are, for certain purposes, played back simultaneously. It, therefore, becomes necessary to coordinate these records in such a way that points of the several channels moving past the pick-up heads at the same time denote densities of the same element of the transparency to be analyzed, but to different primary colors thereof. If the records of more than one transparency are played back simultaneously, these transparencies will generally represent images of the same pattern or configuration, but not necessarily of the same respective densities, and it is the purpose of this operation to provide eventually a comparison of the densities of corresponding points on the different transparencies. For all these reasons, it is necessary to coordinate the records impressed upon ribbon 148 in such a way that points of these records moving past the pick-up heads at any given instance are relayed to the proper points of their respective transparencies. Where the deflection plates of the scanning cathode ray tube 32 be connected in the conventional way directly to ordinary sweep circuits, the probability of obtaining this objective would be very small indeed. In order to solve the problem, I employ the following means:

The deflection means are not connected directly to the sweep circuits, but the sweep circuit voltages or currents are first recorded upon ribbon 148, and two channels 170 and 171 on the extreme left have been reserved for this purpose. These sweep circuits are played back whenever records are made of densities, and the deflection plates of the cathode ray tube are energized not by the sweep circuit generators themselves, but by the records made prior to the operation proper. The two sweep circuit generators are 162 and 163, and they have, in the usual manner, two entirely different frequencies, one many times higher than the other one. These linear saw-tooth voltage generators, as they are sometimes called, are through the sets of contacts of relays which form part of the control circuit, already mentioned, connected to the recording heads 160 and 161. Prior to the operation of the device, the ribbon 148 is moved past these heads, and records of the two sweep circuits or saw-tooth wave voltages are made on the two channels 170 and 171 on the extreme left. During the following operations, i. e., when records of densities are impressed upon any of the other nine channels of ribbon 148 the deflection elements 54 and 55 of the cathode ray tube 32 are connected across two other pairs of relay contacts to the play-back heads 160' and 161'. No amplifiers have been shown, but, of course, if necessary, suitable amplifiers may be inserted between elements 160' and 54, and 161' and 55, respectively.

In this manner any part of the tape 148 has a definite relation to the position of the scanning beam of tube 32, and this scanning beam will, therefore, always occupy the same space within the tube, or the luminous spot upon screen 56 will always occupy the same space upon that screen, whenever the same part of tape 148 passes the recording or pick-up heads. Therefore, the magnetic tracks on tape 148 may be conceived to contain sets of coordinated points, two of these points determining the position upon the luminous spot upon screen 56 and the others denoting, respectively, the density to light of different colors of the same point of one transparency or a corresponding point of different transparencies, or sets of separation negatives.

In order that the foregoing be true, two necessary assumptions have been made, first, that all transparencies have the same size and occupy the same position relative to the screen 56 of the cathode ray tube, and second, that the distance between corresponding recording and pick-up heads, for example, between 151 and 151', must be exactly the same for all channels. The latter problem could conceivably be solved in a very simple manner, by using the same magnetic assemblies as play-back and pick-up heads, respectively, but in the interest of clarity, separate heads have been denoted in the drawing of Fig. 2.

*Means to correct errors caused by deficient dyes*

Practically all successful color print processes follow the "subtractive" principle, i. e., the finished print is composed of three layers which are dyed cyan, magenta and yellow, respectively. These colors are usually called minus red, minus green and minus blue, and are at the present time invariably imperfect in varying degrees. For example, the minus red color is supposed to absorb red only, i. e., build up densities to red light, but as a matter of fact, always absorbs some green and blue light, or builds up undesired green and blue densities to an extent which is far from negligible. The two other colors, minus green and minus blue, act similarly.

This deficiency can be corrected by subtracting from the density values of one primary color, values which are proportional to the density values of the two other primary colors. This process is usually referred to as "masking," and for a more detailed discussion I refer to the existing literature, for example, Carl W. Miller, Principles of Photographic Reproduction, page 313 et seq.

Since the subtraction of one density from another is not possible by purely photographic means, the process in practice is usually performed by adding at least one positive, printed from one separation negative, to another separation negative. With an electrical device of the type which forms this invention, this limitation no longer exists, and I use for this correction a network by means of which values proportional to densities of two of the primary colors are deducted from the density values of the third primary color.

The electrical circuit which performs this function is shown in block form in Fig. 2 as 200, and in more detail in Fig. 5. The subtraction of voltages representing density values is performed in the usual manner by connecting a number of potentiometers in series. Upon one of these potentiometers I impress a voltage representing densities of one separation negative or of the corresponding values obtained by analyzing a color transparency through a filter of one primary color. Upon the two other potentiometers I impress voltages proportional to the density values of the two other separation negatives or volues obtained by analyzing a color transparency through filters of the two other primary colors. The polarity of the last named potentiometers, however, is chosen opposite to that of the first potentiometer so that the voltage impressed upon all three represents the difference between the voltage impressed on the first potentiometer and the two voltages impressed upon the two last-named potentiometers. All potentiometers are equipped with sliding contacts so that the proportionality factors, with which the various voltages representing densities are multiplied, can be freely adjusted for best results. A preferred method to adjust them will be described in a later paragraph.

The network which performs the correction due to deficient colors will be called the "masking" network, and comprises three parts, each in turn having three sub-parts, of which one part always carries a voltage proportional to the density of one primary color and the two others carry voltages proportional to the densities of the two other primary colors.

It will be clear that a network of this type requires careful insulation of the various component parts from each other, so that unwanted leakages and circulating currents are avoided. This can be done in a number of ways, for example, the played back voltage representing one primary color may be fed into the primaries of the three transformers with insulated secondaries which deliver secondary voltages which are then utilized further. It is also possible to use one transformer with one primary and three secondaries which are insulated from each other. It is also possible to avoid transformers altogether by equipping the magnetic assemblies which are used as pick-up heads for the voltages to be played back with three separate windings which are insulated from each other. The insulation of the various voltages can also be performed within the amplifiers, and many amplifier circuits are known which can perform this function. It is also possible not to insist upon complete insulation of the various circuits from each other, but merely by the insertion of high ohmic resistors at the proper points to reduce circulating currents to values of negligible magnitude. All of these means are well known in the art and, since they form no part of this invention, have not been shown in detail. It is also understood that the means which are necessary to demodulate a played back signal carried by a carrier frequency wave are included in the transformer or amplifier means which are shown schematically in block form in Figs. 2 and 5.

Referring to Fig. 5, the input into the circuit is represented by three wires, 201, 202 and 203 which are also shown in Fig. 2. Depending upon the position of the control relays, these wires carry either the played back signals from pick-up heads 154', 155', 156', or from 157', 158' and 159'. These represent, respectively, the recorded density values of a second and of a third transparency, the precise purpose of which will be discussed later. As can be seen in Fig. 5, each of the horizontal wires 201, 202, and 203 is connected to one of the vertical wires 201', 202', 203', which lead, respectively, to amplifiers or transforming units 211, 211', 211'', 212, 212', 212'', 213, 213', 213''. The output of each of these amplifiers or transforming units is impressed on one of the potentiometers which are designated 221, 221', 221'', 222, 222', 222'', 223, 223', 223''. The polarity of two of the poteniometers is always opposed to that of the third one, so that the sum of the three voltages represents the difference between one and the two other ones. For example, the voltage between points 230 and 231 can be considered as $$E_{230-231} = E_{221} - E_{222} - E_{223}$$

One point of the output network of each of the three parts of the masking network is shown to be grounded; for example, point 230, and the other points are eventually connected to the output wires 241, 242 and 243.

While all potentiometers have been shown in the wiring diagram of Fig. 5 schematically and comprise a straight resistor element, they are in practice, preferably, of circular shape so that the sliding contact may be fastened to a rotatable shaft. The various shafts are in turn connected to the handwheels shown in Fig. 1.

Means to correct contrast errors

Contrast errors may be caused by incorrect development, but it can be seen that to some extent they are inherent in a process such as described in the last paragraph, because the contrast of an original separation negative for example, is by necessity lowered if it is combined with two positives made from the two other separation negatives, or, what amounts to the same, if two voltages proportional to densities to two primary colors are deducted from a third voltage representing densities to the third primary color.

In photographic practice attempts are usually made to compensate for the lowered contrast due to masking by overdeveloping the original separation negative, so that it has too much contrast. This, of course, has to be nicely balanced out so that after the masking the contrast is just right. It can easily be seen that by a trial and error method such as this, perfect results can never be achieved with certainty.

For the purpose of the discussion in this, as well as in the next paragraph, it should be kept in mind that photographic operations have geometric as well as electric analogues. Geometrically it is useful in this particular instance to consider a modification of the usual representation in which density is plotted as a function of logarithmic exposure values. It is, in this instance, more practical to consider a curve in which density values of one transparency or one set of separation negatives are plotted as a function of the corresponding densities of another transparency or sets of separation negatives. As will be noted later, the second transparency or the second set of separation negatives is preferably obtained by photographing a print made from the first transparency or from the first set of separation negatives. Contemplating such a curve representing densities of one transparency as a function of the density of the corresponding points of another transparency, contrast or gamma is, of course, represented by the slope that the straight part of the curve assumes with respect to the horizontal.

In electrical terms contrast may be conceived similarly, i. e., as the ratio between an output voltage and a corresponding input voltage of any suitable transformation device. Such a device for A. C. may, for example, be an ordinary transformer, or a potentiometer may be used for A. C. and D. C. Also, the various vacuum tube circuits may fall into this classification. Therefore, in an electrical network which is in effect an analogue computer, contrast may be adjusted by merely changing the transformation ratio of a transformer or the adjustment of the potentiometer. The latter case has been chosen by me because it is by far the simplest.

The electrical adjustment of contrast by means of potentiometers can be performed in two different ways. It is, for example, conceivable to impress the voltage between points 230 and 231, Fig. 5, on an additional potentiometer. It is, however, easier, and serves the same purpose to pursue the same method that is usually pursued photographically, i. e., exaggerate the contrast of the original separation negative correspondingly so as to make up for the lowered contrast due to the subtraction of density values which is usually called masking. This means that no additional apparatus is required, since, with reference to Fig. 5, potentiometer 221 can simply be used for this purpose. The potentiometers 222' and 223'' can be used in a similar manner.

It may be mentioned at this point that it is a peculiar advantage of my method of storing the density values by recording them that contrast increases as well as contrast decreases are possible. If, for example, the corrected densities without storage would be converted directly into grid bias voltages and fed back into the original cathode ray tube 32, a typical feed back circuit would be formed, which could only be used for lowering contrast values, since it can easily be seen that any attempt to increase contrast values would either lead to theoretically infinite cathode ray tube currents or would cause the entire system to break into oscillations. By my method of storing or recording densities first and modulating the output of the cathode ray tube in accordance with the played back stored values, the danger of feed back is circumvented.

Means to correct exposure errors

Exposure errors, as distinguished from contrast errors, are not inherent in the process, but are in practice, even with the aid of exposure meters, not always entirely avoided. The geometric analogue of increased or decreased exposure in a graph which represents densities of one transparency as a function of densities of another transparency is a vertical shift of the corresponding curve parallel to itself. The electric analogue is the addition or subtraction of a constant voltage to or from a played back voltage representing densities. This is shown in Fig. 5. Potentiometer 245 is in series with the voltage built up between points 230 and 231. This potentiometer receives its voltage from a battery or the like 245'. Since exposure errors may be in one direction as well as the other, i. e., since we may have over-exposures as well as under-exposures, the polarity of the voltage impressed upon 245 cannot be predicted. Point 231 is, therefore, connected to the midpoint of battery 245'. so that the sliding contact of potentiometer 245, depending upon the direction in which it is moved, may either add or subtract a certain voltage from the voltage between points 230 and 231. Similar provisions are made for the two other parts of the masking circuit, i. e., we have potentiometer 246 fed by battery 246' and potentiometer 247 fed by battery 247'. All potentiometers are, of course, actuated by handwheels, as shown in Fig. 1.

Means to correct errors due to the distortion of density values by photographic emulsions The behavior of photographic emulsions is usually shown by a curve which represents density values as a function of logarithmic exposure values. This curve is always composed of three parts, the "toe," a straight portion, and the "heel." In the toe and the heel density values do not increase in proportion to logarithmic exposure values. Consequently any picture that has sufficient contrast to register density values in either the toe or the heel, or both, shows necessarily a distortion of density values. For black and white pictures this is of little consequence, since in black and white work falsified density values within pretty wide limits are usually tolerated, but the situation is entirely different in color work.

Each element of a colored image contains three different densities for the three primary colors, respectively. In an ideal picture, these three densities will be the same as the respective densities of the original object. If all three densities are uniformly lower or uniformly higher than the original object, the element will appear in the image too bright or too dark, but it still will have the same color. If, however, and that is more often than not the case, the density values for the three primary colors are so different from each other that at least one of them fails to fall into the straight line then the respective share of the three colors in the image will be different from the share in the original object, and the image will appear of a different color than the object. In other words, not only the brightness but also the color itself will appear distorted. This is very objectionable, and even small amounts of color distortion cannot be tolerated. This is the reason for the extraordinarily small latitude possessed by color films or color prints, i. e., unless the density values of an element for all three colors fall within the relatively narrow straight line of the curve, the color of the reproduction will differ noticeably from the color of the original object. In other words, it is not possible, as in black and white, to utilize an appreciable portion of the heel and toe, but the entire reproduction must be limited to the straight part of the curve, which is in most instances extremely narrow.

The only theoretical way in which this condition could be remedied by purely photographic means would be to use color print material with an emulsion which has characteristics opposite to or supplementing the characteristics of the emulsion of the transparency in such a way that the two together form a system which again reproduces density values which are linearly proportional to the density values of the original object. Unfortunately such an emulsion is unknown, and, therefore, it was in the past impossible to correct this condition, and all color print processes have uniformly been afflicted with the objectionably narrow contrast range that they could cover.

With my invention, which is in many respects identical with an electric analogue computer, this condition can be rectified, and I use a transformation device which receives a voltage corresponding to distorted density values as an input and which has an output voltage which is nonlinearly related to the input in such a way that eventually the linearity between density values of one transparency and density values of another transparency, or between density values of a transparency and density values of an original object, is restored. The function according to which this transformation must take place depends upon the characteristics of the photographic emulsions, and is, therefore, not easily predictable. In the case of such a more or less arbitrary function, it is desirable to incorporate an adjustment so that the operator can restore the linearity in any event. A preferred device to serve this purpose will be described in the next paragraph.

Three of these "linearity correctors" are used which are shown in block form in Fig. 2, and which are designated 251, 252, and 253. The electric circuit of one of them is shown in detail in Fig. 6. It comprises a cathode ray tube 255, an adjustable mask 256 and a photo-electric cell 257. It is in this respect similar to the photocell current-density converter described in an earlier paragraph, but the electrical connections are simpler, since it lacks the feed-back feature of the first-mentioned converter.

The cathode ray tube 255 has the usual elements, filament 260, indirectly heated cathode 261, grid 262, focusing elements 263, one pair of deflection plates 264 and a screen 265. The focusing elements 263 have a configuration causing a luminous line to be formed upon the screen 265. This line is deflected by the deflection plates 264, which by means of wire 241 is connected to one of the output terminals of the masking network, as shown in Figs. 2 and 5. The cathode, control grid, focusing elements and the screen are connected to corresponding points of the potentiometer 268 which receives voltage from a battery 269.

The photocell 257 is disposed at a suitable distance from the screen 265, and is again of the photo-multiplier type. It contains a photo-sensitive cathode 270 and nine additional electrodes 275. The cathode and the various electrodes are connected, respectively, to points of potentiometer 272 which is energized by battery 273. The wire connecting the extreme left end of the potentiometer to the last electrode is interrupted and receives a resistance 274. The voltage piling up upon this resistance is the output voltage of the transformation device and, if everything is adjusted properly, is directly proportional to density values which have been corrected for linearity.

The adjustable mask is shown in detail in Figs. 7 and 8. It comprises a frame 280 which acts as a support for the other elements. This frame has a rectangular aperture 281 which during operation is partly covered by a chain formed by a number of elements 282 which are linked together as illustrated. Two of these elements are shown again in Fig. 10, and it can be seen that they have a peculiar shape which permits them to assume different positions relative to each other, but still block the passage of light between them. Each of these elements is pulled upwardly by a spring 283. In the interest of simplicity only two of these springs are shown in Fig. 7. The upper ends of these springs are fastened to a stationary cross bar 284.

Slidably arranged on base 280 are a plurality, ten in this instance, of slidable elements 290 which carry at their lower ends rollers 291 which are in contact with the aforementioned channels 282. A cross section through these slidable elements is shown in Fig. 9. They are also equipped with fins to prevent the passage of light between them.

The upper ends of members 290 have threaded holes which engage, respectively, as many rotatable screws 291 which terminate in small handwheels 292. These handwheels have already been shown in Fig. 1 and their function is quite clear. Rotating one of them rotates the corresponding screw 291 and shifts thereby one of the members 290. This in turn changes the position of the roller 291 attached to this member, and this adjusts the position of the chain formed by links 282. In this manner the shape of the chain can be changed point by point, by manipulating one handwheel 292 after the other.

The electrical function of the transformation device is similar to that of the photocell current-density converter. A voltage corresponding to a photographic density which is as yet uncorrected for distortion is taken from the masking network and impressed through wire 241 upon the deflecting means 264 of the cathode ray tube 255. This in turn causes the luminous line which is formed upon the screen of this cathode ray tube to assume a position at a distance K from a point of origin L in Fig. 7. The length of this line M is a function of the shape to which the operator has adjusted the chain and, therefore, a function of the deflection K. The light output of the luminous line is, of course, proportional to its length and, therefore, the output of the linearity corrector can be adjusted until the voltage impressed upon resistor 274 is proportional to a density from which the objectionable distortion has been removed.

Density-bias converter

By the various means described up to this point voltages have been generated which are proportional to density values which have been corrected for the various errors with which they are usually afflicted. These three voltages representing uncorrected density values are carried by the wires 301, 302 and 303, respectively, as shown in Fig. 2. It is the purpose of the converter to be described in this paragraph to convert these voltages, one at a time, into grid bias voltages which during the actual printing process can be impressed upon the grid 52 of the cathode ray tube 32 illuminating the transparency 70.

The mathematical law according to which this transformation must take place is very easily developed, and can be stated briefly as follows: A real transparency 70 illuminated by the cathode ray tube 32 with a properly modulated light output must be identical to an ideal transparency, i. e., one that has density values corrected for all the errors enumerated above, illuminated by an ordinary unmodulated source of light. In other words, $$L_{mod} \cdot 10^{-D_R} = L_{const} \cdot 10^{-D_C}$$

where $L_{mod}$ means modulated light, density of the real transparency, $L_{const}$ unmodulated light, $D_C$ corrected density. $D_R$ the modulated light output therefore is $$L_{mod} = L_{const} \cdot 10^{-(D_C - D_R)}$$

This light output can again be expressed in terms of cathode ray tube constants, i. e., $$L_{mod} = b(I_0 - ae)$$

where $a$ and $b$ are the same constants that have already been described in the paragraph referring to the photocell current-density converter. $I_0$ is a suitably selected "normal" cathode ray tube current. In practice this value will be approximately one-half the maximum current that the cathode ray tube can carry. $e$ is the output voltage of the density-bias converter which is impressed upon the grid of the cathode ray tube as additional negative bias.

From the two expressions for $L_{mod}$ it follows $$e = \frac{I_0}{a}(1 - 10^{-(D_C - D_R)})$$

Again the first constant term can be segregated and be represented by a battery and merely the second term will be delivered by the converter described in this paragraph. It can be seen that $e'$ is a direct function of the difference between the real, i. e., uncorrected, density of the transparency and the desirable corrected transparency.

$$e' = \frac{I_0}{a} \cdot 10^{-(D_C - D_R)}$$

It is, therefore, necessary to generate first a voltage which is the difference between the two voltages representing, respectively, uncorrected and corrected densities of the same transparency. For this purpose, the wires 201, 202 and 203 which, respectively, carry voltages representing uncorrected densities are connected to wires 201", 202" and 203". The voltages representing corrected densities are carried by wires 301, 302 and 303. It can be seen at the right side of Fig. 2 that the three corresponding pairs of wires, i. e., 201" and 301, 202" and 302 and 203" and 303 are, respectively, connected to three relays equipped with double pole contacts. Only one of these relays is closed at any time and thereby the density-bias converter 310 is only energized by one pair of voltages representing, respectively, uncorrected and corrected voltages. In Fig. 11 this converter is shown in more detail.

The wire carrying a voltage representing uncorrected densities, for example 201" is connected to an amplifier 204. The output of this amplifier is impressed upon resistor 305. As has been explained above, the output is assumed to be insulated from the input. The voltage carried by wire 306 represents, therefore, the difference between the corrected and uncorrected density values, respectively.

The converting unit itself again consists of a cathode ray tube, a mask, and a photo-electric cell. The cathode ray tube 311 has a filament 312, an indirectly heated cathode 313, a control grid 314, and two focusing members 315 adapted to form a luminous line upon the screen 316. The luminous line is deflected by a pair of deflection elements 317 which are energized by the voltage carried by wire 306. All elements with the exception of the deflection elements are connected to suitably selected points of a potentiometer 318 which receives voltage from a battery 319 or the like.

In front of the screen 316 is a mask 321 which is shown in detail in Fig. 12. It represents $10^{-(D_C - D_R)}$ as a function of $D_C - D_R$ between the limits of $D_C - D_R = -.5$ and $D_C - D_R = +.5$.

At a suitable distance in front of this screen is a photo-electric cell of the multiplier type called 325. It again has a photo-sensitive cathode and a number of electrodes which are in the usual manner connected to points of a potentiometer 326 energized by a battery 327. The wire leading from the left end of the potentiometer to the last electrode of the multiplier carries a resistor 328. The voltage piling up on this resistor represents $$e' = \frac{I_0}{a} 10^{-(D_C - D_R)}$$

This resistor is in series with a potentiometer 330 which receives voltage from a battery 331. The sliding contact of this potentiometer is so adjusted that the voltage impressed upon the potentiometer corresponds to the first term of the equation for $e$, i. e., $$\frac{I_0}{a}$$

The two wires 332 and 333 carry the output of the density-bias converter, which is by these wires fed back into the control grid of the cathode ray tube 32 as shown in Fig. 2. The voltage impressed upon resistors 328 and 330, respectively, are of opposite polarity, i. e., the voltage impressed upon 330 tends to increase and the voltage impressed upon 328 tends to decrease the negative bias that grid 52 of cathode ray tube 32 has with respect to its cathode 31.

In a previous paragraph which disclosed the photocell current-density converter, a different method of modulation of the light output of the cathode ray tube was described. As will be noted later, in addition to the modulation required for the photocell current-density converter and for the density-bias converter discussed in this paragraph, we shall also have a third operating condition for the cathode ray tube in which the grid bias is kept constant. In order to select the proper one of the three modulating possibilities, three relays are provided which are shown at the extreme left of Fig. 2. Only one of them is energized at any given time.

Indicating device

In order to facilitate the proper adjustment of the device prior to making an actual print, three indicating devices are provided, by means of which densities of corresponding points of two transparencies can be compared. These indicating devices in the preferred embodiment of my invention consist of three cathode ray tubes which are schematically shown as large circles in Fig. 2 as 41, 42 and 43. These circles represent the screens of these tubes and have already been shown in Fig. 1. The tubes themselves are in every respect conventional, comprising the usual source of electrons, focusing members, two sets of deflection means, and, of course, a screen as already mentioned. The principle is that one of the deflection means is actuated by a voltage representing the density of a first, and the other deflection means are actuated by a voltage representing the density of corresponding points of a second transparency. In the preferred method by which the device can be adjusted, the second transparency or set of separation negatives is obtained by photographing a colored print made from a first transparency or from a first set of separation negatives.

Referring to Fig. 2, the densities to the three primary colors of a first transparency are recorded upon channels 181, 182 and 183. These recordings are picked up by heads 151', 152', and 153', and are across the contacts of a triple pole relay carried by wires 341, 342, and 343 to the horizontal deflection elements of tubes 41, 42 and 43, respectively. The vertical deflecting elements of the same tube are, respectively, connected to wires 303, 302 and 301. The luminous pattern displayed upon the screen of these tubes, therefore, represents directly density values as carried by wires 301, 302 and 303, i. e., which have been corrected for the various errors as a function of the corresponding density values of a first transparency. These luminous patterns are represented in a system of rectangular coordinates and, if so desired, these coordinates may be calibrated in density values. These values can then be directly read off the screens of the indicating cathode ray tubes.

Sequence control

The elements described in these specifications can be connected in a plurality of ways and can perform several distinct functions, and this should be done in a certain predetermined sequence. In order to enable the operator to perform this program conveniently, a control circuit has been incorporated. This control circuit comprises four seventeen step single pole switches and twenty-three relays. The relay coils and contacts are shown in Fig. 1, and the connections between the four seventeen step switches and relays are shown in Fig. 13.

As a measure of protection the circuit is not connected directly to the line, but to a secondary coil 450 of a transformer which has a primary coil 451 which is connected to the line. One side of the secondary coil 450 is grounded and so is one side of all relay coils.

The four pole seventeen step switch comprises four rotatable switch blades 400, 400', 400'', 400'''. These switch blades are mechanically connected and are usually mounted on a common shaft. They are all connected to the live side of the secondary coil 450 and, therefore, need not be insulated from each other. These switch blades slide, respectively, on rows of contact buttons which are designated 401 to 417, 401' to 417', 401'' to 417'' and 401''' to 417'''. These contact buttons are connected to the various relays as shown in the diagram of Fig. 13.

The various relays perform the following functions:

Relay 421 is equipped with two normally open and two normally closed contacts. The normally open contacts form the connection between the sweep circuit voltage generators 162 and 163 and the recording heads 160 and 161. The two normally closed contacts connect the play-back heads 160' and 161' to the deflection plates 54 and 55 of the cathode ray 32.

422 is not strictly a relay, but merely a solenoid which when energized moves mirror 34 from the position shown in solid lines to the position shown in dotted lines. This solenoid, as well as the three following, may, of course, be replaced by small motors.

423, 424 and 425 are solenoids or small motors which place one of the colored filters 66, 67 and 68 into the path of the light emanating from the screen 56 of the cathode ray tube 32. These filters are present only when prints are made from color transparencies and they are omitted when prints are made from separation negatives.

Relays 426, 427 and 428 are each equipped with one normally open contact. They connect the grid 52 of the cathode ray tube 32, respectively, with the photocell current-density converter 110, with the density-bias converter 310, and with the extreme left tap of potentiometer 60. Thereby three methods of modulation for the grid are provided. The first two have been described in previous paragraphs, and the last merely means that the grid voltage is kept constant during operation.

Relays 429, 430 and 431 provide the connection between the photocell current-density converter and the recording heads 151, 152 and 153. These recording heads impress upon recording channels 181, 182 and 183 records of densities to three primary colors of number 1 transparency.

Relays 432, 433 and 434 perform the same function with respect to recording heads 154, 155 and 156, whereby density records of three different primary colors of number 2 transparency are impressed upon channels 184, 185 and 186.

Relays 435, 436 and 437 again perform the same function with respect to recording heads 157, 158 and 159, which record densities to light of three primary colors of number 3 transparency on channels 187, 188 and 189.

Relays 438, 439 and 440 are each equipped with three normally open contacts. Relay 438 connects the played back voltages picked up by 150', 152' and 153' to the horizontal deflection elements of indicating tubes 41, 42 and 43. Relays 439 and 440 connect the played back voltages, picked up by the other recording heads, to the masking network, to the vertical deflection elements of indicating tubes 41, 42 and 43 and to the density-bias converter 310.

Relays 441, 442 and 443 are each equipped with two normally open contacts. They are adapted to connect, respectively, one pair of voltages representing corresponding corrected and uncorrected densities to the density-bias converter 310. The precise function of this control circuit and its coaction with the other elements will be shown in detail in the following two paragraphs.

*Adjustments*

In order that a complex device such as described in these specifications may work under the best possible conditions, means must be provided to adjust the various circuit constants easily and conveniently. This is done by applying a substitution principle and by interpreting the luminous displays upon the screens of the cathode ray tubes 41, 42 and 43 properly.

The substitution principle may be explained as follows: If two transparencies or two sets of separation negatives have identical density values, then they will both yield identical prints, assuming, of course, that both prints are exposed and processed under the same conditions and made on material of the same kind. Now, if the second transparency, or the second set of separation negatives, is obtained by photographing a color print made from a first transparency or a first set of separation negatives, then the number 2 transparency will generally not have the same density values as the original number 1 transparency, but will be afflicted with all the errors that have been discussed in previous paragraphs. Therefore, a print made from number 2 transparency will be different from a print made from number 1 transparency. If, however, by the machinery described in these specifications the cathode ray tube 32 is so modulated that its light output fluctuates in the proper measure as its luminous point scans the number 2 transparency, then in effect the density values of number 2 transparency can be corrected and a print can be obtained from number 2 transparency that is identical to the print previously obtained from number 1 transparency. After the device is properly adjusted, the print made from number 1 transparency is replaced by an actual scene. If the same corrections are now applied to a transparency or set of separation negatives obtained by photographing the actual scene, then a print made from the last-named transparency will have identical density values as the actual scene. In the following the transparency or the set of separation negatives made from an actual scene will be called number 3 transparency.

The displays upon the screens of the indicating cathode ray tubes 41, 42 or 43 are adapted to illustrate and indicate the errors with which a transparency or set of separation negatives may be afflicted. These errors fall into four classifications caused, respectively, by deficient dyes, by incorrect contrast, by incorrect exposure and by density distortion due to emulsion characteristics.

The way in which errors due to deficient dyes manifest themselves upon the screens of the indicating cathode ray tubes may be explained as follows: Three color prints or transparencies are usually made by the subtractive process, i. e., they contain three superimposed layers which contain cyan, magenta and yellow dyes, respectively. The cyan dye is supposed to absorb red light only but to pass green and blue light without absorption. As a matter of fact, no cyan dye will meet this condition, and all cyan dyes absorb in addition to red light certain quantities of green and blue light. Therefore, the cyan image does not merely represent "red" densities, but also "blue" and "green" ones which are not wanted. The same is true with magenta, which is supposed to absorb green but to pass red and blue. As a matter of fact, it absorbs very appreciable amounts of red and blue, or the magenta layer forms not merely densities to green light, but very appreciable densities to red and blue light. The yellow dye behaves in a similar manner, although the errors introduced by yellow are the smallest of the three colors.

It is assumed at this point that the number 1 transparency or the number 1 set of separation negatives contains theoretically all, and in practice at least very many, combinations of records of all three colors in all different intensities. Suitable devices and methods to obtain test prints or transparencies of this kind have been disclosed in my Patents #2,450,307, 2,446,111, and 2,446,112. Consequently any point of the print made from number 1 transparancy that has a "red" density, i. e., which has a certain concentration of dye in the cyan layer, may also have some unwanted "red" densities associated with it which originated from the magenta and yellow layers. These unwanted densities may be of any magnitude within the limits of the absorption of these particular dyes and, therefore, an uncertainty is introduced into the value of the "red" density of number 2 transparency as a function of the "red" density of number 1 transparency. In other words, if the print made from number 1 transparency were, for example, of cyan color only, a unique relationship could be established between density values of the two transparencies, and the display upon the screen of the indicating cathode ray tube 41 would be formed by a thin line which would be merely distorted by the other errors such as incorrect contrast, incorrect exposure and density distortion. However, in reality we have three layers and, therefore, any density to red light introduced by the cyan layer of the print made from number 1 transparency may be associated with unwanted densities to red light originating in the magenta and yellow layers. If the first transparency contains numerous color combinations, these unwanted added densities may be, within certain limits, of any magnitude and, therefore, the relationship between the densities of the two transparencies is no longer unique, but uncertain within a given range. The result is that no longer a line is obtained which represents the desired function, but a relatively broad band, as is indicated on the screen of tube 41 in Fig. 1.

The errors introduced by incorrect contrast and incorrect exposure are easier to understand. Correct contrast would register upon the screen of the indicating cathode ray tube as a straight line disposed under a 45° angle with respect to the horizontal. In correct contrast means that the straight portion of this curve assumes a different angle, as for example shown in the dotted lines 500' on the screen of cathode ray 42 in Fig. 1. Incorrect exposure has the effect of shifting the entire line parallel to itself in a vertical direction. An over exposed image, therefore, would register on the screen of the cathode ray tube by a position of the curve similar to the one assumed by line 500''. Correct contrast and correct exposure are shown by the curve 500 drawn in solid lines that has a straight portion, the extension of which passes the point of origin of the rectangular system of coordinates.

The lines on the screen of tube 42 are still S-shaped, and are still assumed to be afflicted with density distortion. After the density distortion has been removed by the linearity corrector, this line will be a straight line assuming a 45° angle, as shown by line 501 on the screen of tube 43. This is the ideal condition in which all errors have been removed.

The adjusting procedure of the machine which forms this invention will be described, step by step, in the following:

*Step 1.*—This step is merely a preparation for all the following, and only the linear waves generated by the sweep circuit generators 162 and 163 are recorded upon channels 170 and 171. It can be seen in Fig. 13 that switch blade 400 rests on contact 401, thereby energizing relay 421. This causes the two contacts to be closed which connect sweep circuit generators 162 and 163 to the recording heads 160 and 161. Switch blades 400, 400', 400'' rest on unconnected contacts.

*Steps 2, 3 and 4.*—Here records are made of the densities to red, green and blue light of number 1 transparency. Relay 421 is de-energized and the played back sweep circuit voltages picked up by heads 160', 161' are connected to deflection plates 54 and 55. Solenoid 422 is energized, placing mirror 34 into the position shown in solid lines, whereby the light passing the transparency is directed into the photoelectric cell 35. At each step one of the solenoids actuating the filters 423, 424 and 425 is energized if a colored transparency is used. Relay 426 is energized, and grid 52 of cathode ray tube 32 is thereby connected to the photo-electric cell current-density converter 110. This in turn modulates the light output of the tube in such a way that the currents passing photocell 35 are directly proportional to photographic densities. One of the relays 429, 430 and 431 is closed at each step so that eventually densities of number 1 transparency to the three primary colors, respectively, are recorded by heads 151, 152 and 153 on channels 181, 182 and 183. All other relays are currentless and remain open.

*Steps 5, 6 and 7.*—During these steps a print is made from number 1 transparency. For this purpose the light output of the cathode ray tube 32 remains unmodulated by virtue of the fact that the grid is connected to a constant voltage. In these steps as well as in all following, the deflection plates 54 and 55 of cathode ray tube 32 are again connected to the recorded sweep circuit voltages because relay 421 remains currentless. Solenoid 422 is de-energized whereby mirror 34 assumes the position shown in dotted lines, so that the light passing the transparency 70 is directed into the lens 36 which forms an image of the transparency upon the support 37 for the sensitized sheet. If a color transparency is used, one of the filters 66, 67 and 68 is placed in the path of the light because one of the solenoids 423, 424 and 425 is energized. If a separation negative is used, the entire filter assembly is omitted, but the separation negatives must be changed between each of the three steps. Relay 428 is energized, thereby connecting the grid 52 of the cathode ray 32 permanently to the extreme left end of potentiometer 60, i. e., the grid remains unmodulated during these three steps. All other relays are disconnected during these three steps.

From the foregoing, it will be clear that I prefer to make all color prints by consecutive triple exposures. This is standard practice on those printing methods which start with three separate sheets, the images of which are later detached from their support and superimposed upon each other. Contrary to the most frequent practice, however, I prefer to do the same when I use printing material of the so-called monopack type, i. e., which contains already the three layers superimposed upon each other on their single support. This material is ordinarily exposed to substantially white light penetrating a color transparency, but it is equally feasible to expose such a transparency consecutively using light of three primary colors, respectively.

*Steps 8, 9 and 10.*—Transparency number 1 is removed from the device and replaced by transparency number 2. This transparency is obtained by photographing the colored print which was exposed by the machine itself in the three previous steps. It is assumed that these three exposures produce a color print which is finished by any suitable process and in the same manner in which all future prints will be processed. It is further assumed that number 2 transparency has the same dimensions as number 1 transparency, and that it is placed in front of the screen of the cathode ray tube in such a way that corresponding points assume corresponding positions with respect to said screen. In steps 8, 9 and 10 the red, green and blue densities of number 2 transparency are recorded. Connections are identical to those used previously in steps 2, 3 and 4 with the exception of relays 432, 433 and 434 which, respectively, connect recording heads 154, 155 and 156 to the photocell current-density converter, thereby impressing records of voltages representing densities upon channels 184, 185 and 186.

*Step 11.*—This is the most important step of the adjusting process and the preceding ten steps may be considered merely as a preparation therefore. The recorded densities of the two transparencies, i. e., six records altogether are played back simultaneously. The correcting units are at first all set to zero and the displays upon the screens of the cathode ray tubes 41, 42 and 44 show then the uncorrected densities of the number 2 transparency as a function of the original densities of number 1 transparency. The various corrections are then applied until the displays on these cathode ray tubes approach as nearly as possible straight lines disposed under an angle of 45° with reference to the horizontal. This, of course, indicates that the corrected densities of number 2 transparency equals the densities of number 1 transparency, whereby ideal reproduction would be predicted.

The adjustment of all correcting units to zero is effected as follows: Potentiometers 221, 222' and 223'' are so adjusted that amplifiers 211, 212' and 213' have a "standard" amplification factor which depends upon the chosen electrical characteristics of the various elements, in particular the various cathode ray tubes and photocells. The "standard" amplification factor may be considered to be the one which reproduces densities in such a way that they have the correct values on the vertical or horizontal scales of the indicating cathode ray tubes 41, 42 or 43.

The potentiometers 222, 223, 221, 223', 221" and 222" are adjusted to zero, so that no masking of any kind is applied.

Potentiometers 245, 246 and 247 are adjusted to their respective mid-points, which means that no correction is applied for exposure errors. The various small handwheels of the adjustable mask of the linearity correctors are so adjusted that the chainlike members in front of the aperture assume a straight line under an angle of 45° with respect to the rectangular borders of the aperture 281. This, of course, means that the linearity corrector has an output which is equal to its input, i. e., that it applies no correction.

During the play-back period relays 438 and 439 are energized whereby the recorded densities of number 1 transparency are picked up by heads 151', 152' and 153' and are impressed upon the horizontal deflecting elements of the tubes 41, 42 and 43. Recorded densities of transparency number 2 are picked up by heads 154', 155' and 156' and are by means of wires 201, 202 and 203 conducted to the masking network 200. From this masking network they pass the linearity correctors and are from there by wires 301, 302 and 303 impressed upon the vertical deflection elements of tubes 41, 42 and 43. All other relays are out of the circuit and are de-energized.

The operator now watches the display upon the screens of the indicating cathode ray tubes 41, 42 and 43. This display will at first be a rather wide band such as schematically shown on the screen of tube 41 in Fig. 1. By applying the masking corrections the width of this band is now reduced to a minimum. This is, of course, done in two steps, i. e., the masking corrections of one of the primary colors is applied first. This makes the width of the band smaller, but does not generally reduce it to a line. After the masking corrections for the second color are applied, the width of the band shrinks further, and it should now be at least substantially a thin curved line, as for example shown as 500' on the screen of tube 41 in Fig. 1. The masking corrections referred to in the preceding paragraph are, of course, applied by rotating handwheels on the face of the machine as shown in Fig. 1, which are in operative connection with the corresponding potentiometers shown in Fig. 5.

It can be seen that the straight part of this line assumes an angle with respect to the horizontal which differs from the ideal 45°. An incorrect angle of this type indicates incorrect contrast or gamma and can be adjusted by means of potentiometers 221, 222' and 223".

After this angle has been adjusted the entire curve may still be too high or too low, indicating faulty exposure. A curve indicating over-exposure is, for example shown as 500" on the screen of tube 42 in Fig. 1. The height of this line can be adjusted, or in other words, a correction for faulty exposure can be applied by adjusting potentiometers 245, 246 and 247 by means of the handwheels in the lowest row on the face of the switchboard shown in Fig. 2. The curves should then look substantially like curve 500, i. e., an extension of the straight portion should pass through the point of origin of the system of rectangular coordinates.

The last correction is for linearity and this is applied point by point by adjusting handwheels 292. This changes the shape of the adjustable aperture of the linearity corrector and thereby introduces an empirically determined function into the transformation ratio of the linearity corrector. If fully corrected, the display upon the face of the cathode ray tube is like the line 501 shown on the screen of tube 43, i. e., it is a straight line under a 45° angle with respect to the horizontal, thereby indicating ideal reproduction conditions. In reality this ideal case may not be fully reached, but it can be approached much closer than with the methods now known in the art.

Operation

*Recording densities.*—After the device is adjusted the operation is relatively simple, and may be divided into two consecutive parts. During the first, which comprises steps 12, 13 and 14, the densities of color transparencies or of a set of separation negatives are recorded. This transparency is, in the following, called number 3 transparency, and is obtained by photographing an actual scene. In other words, an actual scene now replaces the test print previously used which was made from number 1 transparency. The electrical connections during this recording are identical with the ones that prevailed in steps 2, 3 and 4, or steps 8, 9 and 10, except that now by the action of relays 435, 436 and 437, the output of the photocell current-density converter is impressed by means of recording heads 157, 158 and 159 upon recording channels 187, 188 and 189.

It would be perfectly possible to erase all or some of the previously recorded densities and use some of the previously used channels for this purpose. It is, however, preferable to provide additional three channels so that the stored density values which have been used for adjusting the device may be preserved. This will give the operator a chance to check the adjustment of the device at any time when he feels that this may be desirable.

Printing

This is the last operation and is again done in three steps, i. e., steps 15, 16 and 17. Again even monopack material is subject to three consecutive exposures with red, green and blue light, respectively. The electrical connections for the printing are as follows:

Relay 421 is de-energized, as it has been in all steps except the first. Thereby the deflection elements 54 and 55 of tube 32 are energized by the recorded sweep circuit which are picked up by heads 160', 161' from channels 170 and 171. Solenoid 422 is de-energized allowing the mirror 34 to assume a position shown in dotted lines, whereby the light passing the transparency falls into lens 36 which forms an image of the transparency in the plane of the support 37. One of the solenoids 423, 424 and 425 is energized during each of these steps, whereby one of the red, green and blue filters is placed into the path of the light by which the print is made. If, instead of a color transparency, a set of separation negatives is used, the entire filter assembly is omitted. The grid 52 of the cathode ray tube 32 is, by means of the now energized relay 428, connected through wires 332, 333 to the output of the density-bias converter 310. This means that the light output of the tube fluctuates in accordance with the bias values which are in turn a function of corrected density values.

Relay 440 is energized and this causes the output of heads 157', 158' and 159' to be impressed upon the masking network 200 and the linearity correctors 251, 252 and 253.

One of the relays 441, 442 and 443 is energized during each of these operations. This means that a pair of corresponding corrected and uncorrected voltages are, respectively, impressed upon the density-bias converter. The output of this converter is, as already has been mentioned, then fed back into the grid circuit of the cathode ray tube 32.

In reality an additional step will be added for erasing recorded densities. In the interest of simplicity this has been omitted in the drawings.

It will be appreciated that actually the entire adjusting process, i. e., steps 1 to 11, does not necessarily have to be performed each time a color print is made. As long as the process itself remains the same, the adjustment of the machine once obtained will be sufficient for many color prints. It may be necessary to check it from time to time, but unless some constant of the process has changed no new adjustment will be necessary for a relatively long time. In this case the operator has to repeat only the last six steps for each actual color print, i. e., record densities for the three colors, then insert sensitized material and play the recorded densities back while an actual print is made.

What I claim as new, is:

1. A device for making photographic color prints comprising: a cathode ray tube, including a screen, means to generate a moving luminous spot upon said screen and a grid controlling the current passing said tube and thereby the intensity of the light emitted by said spot; means supporting a set of separation negatives, one at a time, in front of said screen, said negative adapted to be scanned by said spot in a television like manner; a photo-electric cell; means supporting a sensitized sheet; means to direct light transmitted by said negative either into said photocell or upon said sensitized sheet, said last-named means including means forming an image of said negative upon said sheet; means, operative when said light is directed into said photocell, to convert the currents passing said photocell into voltages proportional to photographic densities and to record said voltages, including means to repeat this process when each of said three separation negatives is placed in front of said screen; means, operative when said light is directed upon said sensitized sheet, to modulate the grid bias of said cathode ray by the means set forth below, including means to play back simultaneously said three previously obtained records, means to modify said played back voltages so as to correct the photographic densities represented by them for errors caused by deficient dyes, errors caused by incorrect contrast, errors caused by incorrect exposure, and means to convert the three played back voltages thus corrected into grid bias voltages, and means to impress one of said grid bias voltages upon the grid of said cathode ray tube, whereby said device is adapted to perform two separate and consecutive operations, during the first operation the light of the cathode ray tube being directed into said photocell, said photocell currents being converted into voltages proportional to photographic densities, and said voltages representing densities to light of three primary colors being recorded, during the second operation, the light of said cathode ray tube being directed upon said sensitized sheet, the recorded three voltages being played back simultaneously, corrected for the various errors enumerated above and converted into grid bias voltages, and the current passing said cathode ray tube being modulated by one of the grid voltages thus obtained.

2. In a device according to claim 1, said means to modify said played back voltages so as to correct the photographic densities represented by them for error caused by deficient dyes comprising an electrical network including means to deduct from a voltage representing the density of elements of one separation negative at least one voltage proportional to the density of the corresponding elements of another separation negative.

3. In a device according to claim 1, said means to modify said played back voltages so as to correct the photographic densities represented by them for errors caused by incorrect contrast comprising at least one electrical device adapted to transform an input voltage into an output voltage proportional to said input voltage, including means to adjust the proportionality factor between said two voltages, and adapted to receive as input voltage one of said played back voltages representing photographic densities.

4. In a device according to claim 1, said means to modify said played back voltages so as to correct the photographic densities represented by them for errors caused by incorrect exposure comprising, an electrical network, including means to add or subtract from a played back voltage representing photographic densities, a voltage which remains constant during, but which can be adjusted prior to, the operation of the device.

5. A device for making photographic color prints comprising a cathode ray tube, including a screen, means to generate a moving substantially white luminous spot upon said screen and a grid controlling the current passing said tube and thereby the intensity of the light emitted by said spot, means supporting a colored transparency in front of said screen adapted to be scanned by said spot in a televisionlike manner, a set of three filters in three primary colors respectively including means to place said filters consecutively, one at a time, into the path of the light passing said transparency, a photo-electric cell, means supporting a sensitized sheet, means to direct light transmitted by said transparency either into said photocell or upon said sensitized sheet, said last-named means including means forming an image of said transparency upon said sheet, means operative when said light is directed into said photocell, to convert the currents passing said photocell into voltages proportional to photographic densities, and to record said voltages, including means to repeat this process when each of said three filters is placed into the path of said light, means operative when said light is directed upon said sensitized sheet, to modulate the grid bias of said cathode ray by the means set forth below, including means to play back simultaneously said three previously obtained records, means adjustable by the operator and adapted to modify said played back voltages so as to correct the photographic densities represented by them for errors caused by deficient dyes comprising an electric network including means to deduct from a voltage representing the density of elements of said transparency to light of one primary color, at least one voltage proportional to the density of the same elements of said transparency to light of another primary color, means to convert the three played back voltages thus corrected into grid bias voltages, and means to impress one of said grid bias voltages upon the grid of said cathode ray tube whereby said device is adapted to perform two separate and consecutive operations, during the first operation the light of the cathode ray tube being directed into said photocell said photocell currents being converted into voltages proportional to photographic densities, and said voltages representing densities to light of three primary colors being recorded, during the second operation the light of said cathode ray tube being directed upon said sensitized sheet, the recorded three voltages being played back simultaneously and, after being adjusted by the operator so as to correct them for errors caused by deficient dyes, converted into grid bias voltages, and the current passing said cathode tube being modulated by one of the grid voltages thus obtained.

6. A device for making photographic color prints comprising a cathode ray tube, including a screen, means to generate a moving luminous spot upon said screen and a grid controlling the current passing said tube and thereby the intensity of the light emitted by said spot, means supporting a set of separation negatives, one at a time, in front of said screen, said negative adapted to be scanned by said spot in a televisionlike manner, a photo-electric cell, means supporting a sensitized sheet, means to direct light transmitted by said negative either into said photocell or upon said sensitized sheet, said last-named means including means forming an image of said negative upon said sheet, means, operative when said light is directed into said photocell, to convert the currents passing said photocell into voltages proportional to photographic densities, and to record said voltages, including means to repeat this process when each of said three separation negatives is placed in front of said screen, means operative when said light is directed upon said sensitized sheet, to modulate the grid bias of said cathode ray by the means set forth below, including means to play back simultaneously said three previously obtained records, means adjustable by the operator and adapted to modify said played back voltages so as to correct the photographic densities represented by them for errors caused by deficient dyes comprising an electric network including means to deduct from a voltage representing the density of elements of said transparency to light of one primary color, at least one voltage proportional to the density of the same elements of said transparency to light of another primary color, means to convert the three played back voltages thus corrected into grid bias voltages, and means to impress one of said grid bias voltages upon the grid of said cathode ray tube whereby said device is adapted to perform two separate and consecutive operations, during the first operation the light of the cathode ray tube being directed into said photocell said photocell currents being converted into voltages proportional to photographic densities, and said voltages representing densities to light of three primary colors being recorded, during the second operation the light of said cathode ray tube being directed upon said sensitized sheet, the recorded three voltages being played back simultaneously and, after being adjusted by the operator so as to correct them for errors caused by deficient dyes, converted into grid bias voltages, and the current passing said cathode tube being modulated by one of the grid voltages thus obtained.

7. A device for making photographic color prints comprising a cathode ray tube, including a screen, means to generate a moving substantially white luminous spot upon said screen and a grid controlling the current passing said tube and thereby the intensity of the light emitted by said spot, means supporting a colored transparency in front of said screen adapted to be scanned by said spot in a televisionlike manner, a set of three filters in three primary colors respectively including means to place said filters consecutively, one at a time, into the path of the light passing said transparency, a photo-electric cell, means supporting a sensitized sheet, means to direct light transmitted by said transparency either into said photocell or upon said sensitized sheet, said last-named means including means forming an image of said transparency upon said sheet, means operative when said light is directed into said photocell, to convert the currents passing said photocell into voltages proportional to photographic densities, and to record said voltages, including means to repeat this process when each of said three filters is placed into the path of said light, means, operative when said light is directed upon said sensitized sheet, to modulate the grid bias of said cathode ray by the means set forth below, including means to play back simultaneously said three previously obtained records, means adjustable by the operator and adapted to modify said played back voltages so as to correct the photographic densities represented by them for errors caused by incorrect contrast comprising at least one electrical device adapted to transform an input voltage into an output voltage proportional to said input voltage, including means to adjust the proportionality factor between said two voltages, and adapted to receive as input voltage one of said played back voltages representing photographic densities, means to convert the three played back voltages thus corrected into grid bias voltages, and means to impress one of said grid bias voltages upon the grid of said cathode ray tube whereby said device is adapted to perform two separate and consecutive operations, during the first operation the light of the cathode ray tube being directed into said photocell said photocell currents being converted into voltages proportional to photographic densities, and said voltages representing densities to light of three primary colors being recorded, during the second operation the light of said cathode ray tube directed upon said sensitized sheet, the recorded three voltages being played back simultaneously and, after being adjusted by the operator so as to correct them for errors caused by incorrect contrast, converted into grid bias voltages, and the current passing said cathode tube being modulated by one of the grid voltages thus obtained.

8. A device for making photographic color prints comprising a cathode ray tube, including a screen, means to generate a moving luminous spot upon said screen and a grid controlling the current passing said tube and thereby the intensity of the light emitted by said spot, means supporting a set of separation negatives, one at a time, in front of said screen, said negative adapted to be scanned by said spot in a televisionlike manner, a photo-electric cell, means supporting a sensitized sheet, means to direct light transmitted by said negative either into said photocell or upon said sensitized sheet, said last-named means including means forming an image of said negative upon said sheet, means operative when said light is directed into said photocell, to convert the currents passing said photocell into voltages proportional to photographic densities, and to record said voltages, including means to repeat this process when each of said three separation negatives is placed in front of said screen, means, operative when said light is directed upon said sensitized sheet, to modulate the grid bias of said cathode ray by the means set forth below, including means to play back simultaneously said three previously obtained records, means adjustable by the operator and adapted to modify said played back voltages so as to correct the photographic densities represented by them for errors caused by incorrect contrast comprising at least one electrical device adapted to transform an input voltage into an output voltage proportional to said input voltage, including means to adjust the proportionality factor between said two voltages, and adapted to receive as input voltage one of said played back voltages representing photographic densities, means to convert the three played back voltages thus corrected into grid bias voltages, and means to impress one of said grid bias voltages upon the grid of said cathode ray tube whereby said device is adapted to perform two separate and consecutive operations, during the first operation the light of the cathode ray tube being directed into said photocell said photocell currents being converted into voltages proportional to photographic densities, and said voltages representing densities to light of three primary colors being recorded, during the second operation the light of said cathode ray tube directed upon said sensitized sheet, the recorded three voltages being played back simultaneously and after being adjusted by the operator so as to correct them for errors caused by incorrect contrast, converted into grid bias voltages, and the current passing said cathode tube being modulated by one of the grid voltages thus obtained.

9. A device for making photographic color prints comprising a cathode ray tube, including a screen, means to generate a moving substantially white luminous spot upon said screen and a grid controlling the current passing said tube and thereby the intensity of the light emitted by said spot, means supporting a colored transparency in front of said screen adapted to be scanned by said spot in a televisionlike manner, a set of three filters in three primary colors respectively including means to place said filters consecutively, one at a time, into the path of the light passing said transparency, a photo-electric cell, means supporting a sensitized sheet, means to direct light transmitted by said transparency either into said photocell or upon said sensitized sheet, said last-named means including means forming an image of said transparency upon said sheet, means operative when said light is directed into said photocell, to convert the currents passing said photocell into voltages proportional to photographic densities, and to record said voltages, including means to repeat this process when each of said three filters is placed into the path of said light, means, operative when said light is directed upon said sensitized sheet, to modulate the grid bias of said cathode ray by the means set forth below, including means adjustable by the operator and adapted to modify said played back voltages so as to correct the photographic densities represented by them for errors caused by incorrect exposure comprising, an electrical network, including means to add to or subtract from a played back voltage representing photographic densities, a voltage which remains constant during, but which can be adjusted prior to, the operation of the device, means to convert the three played back voltages thus corrected into grid bias voltages, and means to impress one of said grid bias voltages upon the grid of said cathode ray tube whereby said device is adapted to perform two separate and consecutive operations, during the first operation the light of the cathode ray tube being directed into said photocell said photocell currents being converted into voltages proportional to photographic densities, and said voltages representing densities to light of three primary colors being recorded, during the second operation the light of said cathode ray tube directed upon said sensitized sheet the recorded three voltages being played back simultaneously and, after being adjusted by the operator so as to correct them for errors caused by incorrect exposure, converted into grid bias voltages, and the current passing said cathode tube being modulated by one of the grid voltages thus obtained.

10. A device for making photographic color prints comprising a cathode ray tube, including a screen, means to generate a moving luminous spot upon said screen and a grid controlling the current passing said tube and thereby the intensity of the light emitted by said spot, means supporting a set of separation negatives, one at a time, in front of said screen, said negative adapted to be scanned by said spot in a televisionlike manner, a photo-electric cell, means supporting a sensitized sheet, means to direct light transmitted by said negative either into said photocell or upon said sensitized sheet, said last-named means including means forming an image of said negative upon said sheet, means, operative when said light is directed into said photocell, to convert the currents passing said photocell into voltages proportional to photographic densities, and to record said voltages, including means to repeat this process when each of said three separation negatives is placed in front of said screen, means, operative when said light is directed upon said sensitized sheet, to modulate the grid bias of said cathode ray by the means set forth below including means to play back simultaneously said three previously obtained records, means adjustable by the operator and adapted to modify said played back voltages so as to correct the photographic densities represented by them for errors caused by incorrect exposure comprising, an electrical network, including means to add to or subtract from a played back voltage representing photographic densities, a voltage which remains constant during, but which can be adjusted prior to, the operation of the device, means to convert the three played back voltages thus corrected into grid bias voltages, and means to impress one of said grid bias voltages upon the grid of said cathode ray tube whereby said device is adapted to perform two separate and consecutive operations, during the first operation the light of the cathode ray tube being directed into said photocell, said photocell currents being converted into voltages proportional to photographic densities, and said voltages representing densities to light of three primary colors being recorded, during the second operation the light of said cathode ray tube directed upon said sensitized sheet, the recorded three voltages being played back simultaneously and, after being adjusted by the operator so as to correct them for errors caused by incorrect exposure, converted into grid bias voltages, and the current passing said cathode being modulated by one of the grid voltages thus obtained.

11. A device for making photographic color prints comprising a first cathode ray tube, including a screen, means to generate a moving substantially white luminous spot upon said screen and a grid controlling the current passing said tube and thereby the intensity of the light emitted by said spot, means supporting a colored transparency in front of said screen adapted to be scanned by said spot in a televisionlike manner, a set of three filters in three primary colors respectively including means to place said filters consecutively, one at a time, into the path of the light passing said transparency, a first photoelectric cell, means supporting a sensitized sheet, means to direct light transmitted by said transparency either into said first photocell or upon said sensitized sheet, said last-named means including means forming an image of said transparency upon said sheet, means operative when said light is directed into said first photocell, to convert the currents passing said photocell into voltages proportional to photographic densities, and to record said voltages, including means to repeat this process when each of said three filters is placed into the path of said light, means operative when said light is directed upon said sensitized sheet, to modulate the grid bias of said first cathode ray by the means set forth below, including means adjustable by the operator and adapted to modify said played back voltages so as to correct the photographic densities represented by them for errors caused by the distortion of density values due to the non-linear characteristic of a photographic emulsion comprising three unit, each unit including respectively a second, third and fourth cathode ray tube, a mask, and respectively a second, third and fourth photo-electric cell, said second, third and fourth cathode ray tube, each including a screen, means to form a luminous line upon said screen, means to deflect said line, and means to connect said last-named means to one of played back and as yet uncorrected voltages, each of said masks, made from opaque material, placed respectively in front of one of said screens and each including an aperture and means under the control of the operator to adjust the size and shape of said aperture, said second, third and fourth photo-electric cells placed respectively opposite one of the screens of the second, third and fourth cathode ray tube and adapted to receive light therefrom, the amount of this light being proportional to the width of said mask at the place to which said luminous line is deflected by the played back, uncorrected voltage at any given instance, the current passing each of said second, third and fourth photocells being proportional respectively to one of the corrected voltages which now represent photographic densities from which the error caused by the distortion of density values due to the non-linear characteristic of photographic emulsions has been removed, and which are linearly proportional to logarithmetic exposure values over an extended range, means to convert the three played back voltages thus corrected into grid bias voltages, and means to impress one of said grid bias voltages upon the grid of said first cathode ray tube whereby said device is adapted to perform two separate and consecutive operations, during the first operation the light of the first cathode ray tube being directed into said first photocell said photocell currents being converted into voltages proportional to photographic densities, and said voltages representing densities to light of three primary colors being recorded, during the second operation the light of said first cathode ray tube directed upon said sensitized sheet the recorded three voltages being played back simultaneously and, after being adjusted by the operator so as to correct them for errors caused by the distortion of density values due to the non-linear characteristics of photographic emulsions, converted into grid bias voltages, and the current passing said first cathode tube being modulated by one of the grid voltages thus obtained.

12. A device for making photographic color prints comprising a first cathode ray tube, including a screen, means to generate a moving luminous spot upon said screen and a grid controlling the current passing said tube and thereby the intensity of the light emitted by said spot, means supporting a set of separation negatives, one at a time, in front of said screen, said negative adapted to be scanned by said spot in a televisionlike manner, a first photo-electric cell, means supporting a sensitized sheet, means to direct light transmitted by said negative either into said first photocell or upon said sensitized sheet, said last-named means including means forming an image of said negative upon said sheet, means, operative when said light is directed into said first photocell, to convert the currents passing said first photocell into voltages proportional to photographic densities, and to record said voltages, including means to repeat this process when each of said three separation negatives is placed in front of said screen, means, operative when said light is directed upon said sensitized sheet, to modulate the grid bias of said first cathode ray by the means set forth below, including means to play back simultaneously said three previously obtained records, means adjustable by the operator and adapted to modify said played back voltages so as to correct the photographic densities represented by them for errors caused by the distortion of density volume to the non-linear characteristic of a photograph emulsion comprising three units, each unit including respectively a second, third and fourth cathode ray tube, a mask, and respectively a second, third and fourth photo-electric cell, said second, third and fourth cathode ray tube, each including a screen, means to form a luminous line upon said screen, meas to deflect said line, and means to connect said last-named means to one of played back and as yet uncorrected voltages, each of said masks, made from opaque material, placed respectively in front of one of said screens and each including an aperture and means under the control of the operator to adjust the size and shape of said aperture, said second, third and fourth photo-electric cells placed respectively opposite one of the screens of the second, third and fourth cathode ray tube and adapted to receive light therefrom, the amount of this light being proportional to the width of said mask at the place to which said luminous line is deflected by the played back, uncorrected voltage at any given instance, the current passing each of said second, third and fourth photocells being proportional respectively to one of the corrected voltages which now represent photographic densities from which the error caused by the distortion of density values due to the non-linear characteristic of photographic emulsions has been removed, and which are linearly proportional to logarithmic exposure values over an extended range, means to convert the three played back voltages thus corrected into grid bias voltages, and means to impress one of said grid bias voltages upon the grid of said first cathode ray tube whereby said device is adapted to perform two separate and consecutive operations, during the first operation the light of the first cathode ray tube directed into said first photocell, said photocell currents being converted into voltages proportional to photographic densities, and said voltages representing densities to light of three primary colors being recorded, during the second operation the light of said first cathode ray tube directed upon said sensitized sheet, the recorded three voltages being played back simultaneously and, after being adjusted by the operator so as to correct them for errors caused by the distortion of density values due to the non-linear characteristics of photographic emulsions, converted into grid bias voltages, and the current passing said first cathode tube being modulated by one of the grid voltages thus obtained.

13. A device for making photographic color prints comprising a first cathode ray tube, including a screen, means to generate a moving substantially white luminous spot upon said screen and a grid controlling the current passing said tube and thereby the intensity of the light emitted by said spot, means supporting a colored transparency in front of said screen adapted to be scanned by said spot in a televisionlike manner, a set of three filters in three primary colors respectively including means to place said filters consecutively, one at a time, into the path of the light passing said transparency, a first photoelectric cell, means supporting a sensitized sheet, means to direct light transmitted by said transparency either into said first photocell or upon said sheet, said last-named means including means forming an image of said transparency upon said sheet, means operative when said light is directed into said first photocell, to convert the currents passing said photocell into voltages proportional to photographic densities, and to record said voltages, including means to repeat this process when each of said three filters is placed into the path of said light, means, operative when said light is directed upon said sensitized sheet, to modulate the grid bias of said first cathode ray by the means set forth below, including means adjustable by the operator and adapted to modify said played back voltages so as to correct the photographic densities represented by them for errors caused by deficient dyes comprising an electric network including means to deduct from a voltage representing the density of the elements of said transparency to light of one primary color, at least one voltage proportional to the density of the same elements of said transparency to light of another primary color, means adjustable by the operator and adapted to modify said played back voltages so as to correct the photographic densities represented by them for errors caused by incorrect contrast comprising at least one electrical device adapted to transform an input voltage into an output voltage proportional to said input voltage, including means to adjust the proportionality factor between said two voltages, and adapted to receive as input voltage one of said played back voltages representing photographic densities, means adjustable by the operator and adapted to modify said played back voltages so as to correct the photographic densities represented by them for errors caused by incorrect exposure comprising, an electrical network, including means to add to or subtract from a played back voltage representing photographic densities, a voltage which remains constant during, but which can be adjusted prior to, the operation of the device, means adjustable by the operator and adapted to modify said played back voltages so as to correct the photographic densities represented by them for errors caused by the distortion of density values due to the non-linear characteristic of a photographic emulsion comprising three units, each unit including respectively a second, third and fourth cathode ray tube, a mask, and respectively a second, third and fourth photo-electric cell, said second, third and fourth cathode ray tube, each including a screen, means to form a luminous line upon said screen, means to defect said line, and means to connect said last-named means to one of played back and as yet uncorrected voltages, each of said masks, made from opaque material, placed respectively in front of one of said screens and each including an aperture and means under the control of the operator to adjust the size and shape of said aperture, said second, third and fourth photo-electric cells placed respectively opposite one of the screens of the second, third and fourth cathode ray tube and adapted to receive light therefrom, the amount of this light being proportional to the width of said mask at the place to which said luminous line is deflected by the played back, uncorrected voltage at any given instance, the current passing each of said second, third and fourth photocells being proportional respectively to one of the corrected voltages which now represent photographic densities from which the error caused by the distortion of density values due to the non-linear characteristic of photographic emulsions has been removed, and which are linearly proportional to logarithmic exposure values over an extended range, means to convert the three played back voltages thus corrected for all 4 errors into grid bias voltages, and means to impress one of said grid bias voltages upon the grid of said first cathode ray tube whereby said device is adapted to perform two separate and consecutive operations, during the first operation the light of the first cathode ray tube being directed into said first photocell said photocell currents being converted into voltages proportional to photographic densities, and said voltages representing densities to light of three primary colors being recorded, during the second operation the light of said first cathode ray tube directed upon said sensitized sheet the recorded three voltages being played back simultaneously and, after being adjusted by the operator so as to correct them for errors due to deficient dyes, due to incorrect contrast, due to incorrect exposure, and due to the distortion of density values by the non-linear characteristic of photographic emulsions, converted into grid bias voltages, the current passing said first cathode tube being modulated by one of the grid voltages thus obtained.

14. A device for making photographic color prints comprising a first cathode ray tube, including a screen, means to generate a moving luminous spot upon said screen and a grid controlling the current passing said tube and thereby the intensity of the light emitted by said spot, means supporting a set of separation negatives, one at a time, in front of said screen, said negative adapted to be scanned by said spot in a televisionlike manner, a first photo-electric cell, means supporting a sensitized sheet, means to direct light transmitted by said negative either into said first photocell or upon said sensitized sheet, said last-named means including means forming an image of said negative upon said sheet, means, operative when said light is directed into said first photocell, to convert the currents passing said first photocell into voltages proportional to photographic densities, and to record said voltages, including means to repeat this process when each of said three separation negatives is placed in front of said screen, means, operative when said light is directed upon said sensitized sheet, to modulate the grid bias of said first cathode ray by the means set forth below, including means to play back simultaneously said three previously obtained records, means adjustable by the operator and adapted to modify said played back voltages so as to correct the photographic densities represented by them for errors caused by deficient dyes comprising an electric network including means to deduct from a voltage representing the density of the elements of said transparency to light of one primary color, at least one voltage proportional to the density of the same elements of said transparency to light of another primary color, means adjustable by the operator and adapted to modify said played back voltages so as to correct the photographic densities represented by them for errors caused by incorrect contrast comprising at least one electrical device adapted to transform an input voltage into an output voltage proportional to said input voltage, including means to adjust the proportionality factor between said two voltages, and adapted to receive as input voltage one of said played back voltages representing photographic densities, means adjustable by the operator and adapted to modify said played back voltages so as to correct the photographic densities represented by them for errors caused by incorrect exposure comprising an electrical network, including means to add to or subtract from a played back voltage representing photographic densities, a voltage which remains constant during, but which can be adjusted prior to, the operation of the device, means adjustable by the operator and adapted to modify said played back voltages so as to correct the photographic densities represented by them for errors caused by the distortion of density values due to the non-linear characteristic of a photographic emulsion comprising three units, each unit including respectively a second, third and fourth cathode ray tube, a mask, and respectively a second, third and fourth photo-electric cell, said second, third and fourth cathode ray tube, each including a screen, means to form a luminous line upon said screen, means to deflect said line, and means to correct said last-named means to one of played back and as yet uncorrected voltages, each of said masks, made from opaque material, placed respectively in front of one of said screens and each including an aperture and means under the control of the operator to adjust the size and shape of said aperture, said second, third and fourth photo-electric cells placed respectively opposite one of the screens of the second, third and fourth cathode ray tube and adapted to receive light therefrom, the amount of this light being proportional to the width of said mask at the place to which said luminous line is deflected by the played back, uncorrected voltage at any given instance, the current passing each of said second, third and fourth photocells being proportional respectively to one of the corrected voltages which now represent photographic densities from which the error caused by the distortion of density values due to the non-linear characteristic of photographic emulsions has been removed, and which are linearly proportional to logarithmetic exposure values over an extended range, means to convert the three played back voltages thus corrected for all four errors into grid bias voltages, and means to impress one of said grid bias voltages upon the grid of said first cathode ray tube whereby said device is adapted to perform two separate and consecutive operations, during the first operation the light of the first cathode ray tube being directed into said first photocell, said photocell currents being converted into voltages proportional to photographic densities, and said voltages representing densities to light of three primary colors being recorded, during the second operation the light of said first cathode ray tube directed upon said sensitized sheet, the recorded three voltages being played back simultaneously and, after being adjusted by the operator so as to correct them for errors due to deficient dyes, due to incorrect contrast, due to incorrect exposure, and due to the distortion of density values by the non-linear characteristic of photographic emulsions, converted into grid bias voltages, the current passing said first cathode tube being modulated by one of the grid voltages thus obtained.

15. In a device according to claim 13, means to establish and maintain coordination between said three records of voltages proportional to densities, obtained respectively when each of said filters of three primary colors was placed into the path of the light, whereby three coordinated points of said three records always have a definite and spatial relationship relative to each other, and whereby during the subsequent play back period sets of three co-ordinated points on said records are always played back simultaneously and always denote densities to light of three primary colors of the same element of the said transparency, said means to establish and maintain said coordination between said three records including a pair of means disposed substantially at right angles relative to each other to deflect the electron beam within said first cathode ray tube, two linear wave generators of different frequencies, means, effective prior to the operation proper of the device, to record the voltages of said wave generators, means to play back said recorded linear wave voltages when voltages representing densities are recorded and when said voltages are played back, including means to establish and maintain a fixed spatial relationship between the records of said two linear wave voltages and said subsequently obtained three records of voltages proportional to photographic densities, and two electric circuits operatively connecting said played back linear wave voltages to the two deflecting means respectively of the first cathode ray tube.

16. In a device according to claim 13, means to establish and maintain coordination between said three records of voltages proportional to densities, obtained respectively when each of said filters of three primary colors was placed into the path of the light, whereby three coordinated points of said three records always have a definite and spatial relationship relative to each other, and whereby during the subsequent play back period sets of three co-ordinated points on said records are always played back simultaneously and always denote densities to light of three primary colors of the same element of the said transparency, said means to establish and maintain said coordination between said three records including a pair of means disposed substantially at right angles relative to each other to deflect the electron beam within said first cathode ray tube, two linear wave generators of different frequencies, means, effective prior to the operation proper of the device, to record the currents of said wave generators, means to play back said recorded linear wave currents when voltages representing densities are recorded and when said voltages are played back, including means to establish and maintain a fixed spatial relationship between the records of said two linear wave currents and said subsequently obtained three records of voltages proportional to photographic densities, and two electric circuits operatively connecting said played back linear wave currents to the two deflecting means respectively of the first cathode ray tube.

17. In a device according to claim 14, means to establish and maintain coordination between said three records of voltages proportional to densities, obtained respectively when each of said separation negatives was placed in front of the screen of the first cathode ray tube, whereby three coordinated points of said three records always have a definite and spatial relationship to each other, and whereby during the subsequent play back period sets of three coordinated points on said records are always played back simultaneously and always denote densities of corresponding elements of said separation negatives, said means to establish and maintain said coordination between said three records including a pair of means disposed substantially at right angles relatives to each other to deflect the electron beam within said first cathode ray tube, two linear wave generators of different frequencies, means, effective prior to the operation proper of the device, to record the voltages of said wave generators, means to play back said recorded linear wave voltages when voltages representing densities are recorded and when said voltages are played back, including means to establish and maintain a fixed spatial relationship between the records of said two linear wave voltages and said subsequently obtained three records of voltages proportional to photographic densities, and two electric circuits operatively connecting said played back linear wave voltages to the two deflecting means respectively of the first cathode ray tube.

18. In a device according to claim 14, means to establish and maintain coordination between said three records of voltages proportional to densities, obtained respectively when each of said separation negatives was placed in front of the screen of the first cathode ray tube, whereby three coordinated points of said three records always have a definite and spatial relationship to each other, and whereby during the subsequent play back period sets of three coordinated points on said records are always played back simultaneously and always denote densities of corresponding elements of said separation negatives, said means to establish and maintain said coordination between said three records including a pair of means disposed substantially at right angles relative to each other to deflect the electron beam within said first cathode ray tube, two linear wave generators of different frequencies, means, effective prior to the operation proper of the device, to record the currents of said wave generators, means to play back said recorded linear wave currents when voltages representing densities are recorded and when said voltages are played back, including means to establish and maintain a fixed spatial relationship between the records of said two linear wave currents and said subsequently obtained three records of voltages proportional to photographic densities, and two electric circuits operatively connecting said played back linear wave currents to the two deflecting means respectively of the first cathode ray tube.

19. In a device according to claim 13, said means to adjust the size and shape of the apertures of the masks which form part of the means to correct the voltages representing photographic densities for errors caused by the non-linear characteristic of photographic emulsions, comprising three mechanisms, each consisting of a frame with an opening, supporting the other elements of said mechanism, a plurality of elongated members adapted to slide in parallel tracks, a plurality of independent means to adjust said members individually in their respective tracks, a plurality of links, attached to each other and forming a chain adjacent to said opening and covering part thereof, and means, including springs operating upon said links, adapted to establish operative contact between said links and said members.

20. In a device according to claim 14, said means to adjust the size and shape of the apertures of the masks which form part of the means to correct the voltages representing photographic densities for errors caused by the non-linear characteristic of photographic emulsions, comprising three mechanisms, each consisting of a frame with an opening, supporting the other elements of said mechanism, a plurality of elongated members adapted to slide in parallel tracks, a plurality of independent means to adjust said members individually in their respective tracks, a plurality of links, attached to each other and forming a chain adjacent to said opening and covering part thereof, and means including springs operating upon said links, adapted to establish operative contact between said links and said members.

21. In a device according to claim 13, said means to convert currents passing the first photocell into voltages proportional to photographic densities comprising a sixth cathode ray tube, an apertured mask, and a sixth photo-electric cell said sixth cathode ray tube including a screen, means to form a luminous line upon said screen and means to deflect said line, said last-named means operatively connected to the first photo-electric cell and actuated by the current passing said first photo-electric cell, said apertured mask placed immediately in front of the screen of said sixth cathode ray tube, made from opaque material and having an aperture with a configuration substantially according to the formula $$Y = A \frac{X \cdot 10^{\frac{-X}{B}}}{C}$$

where Y is the width of said aperture in a direction parallel to said luminous line, X the distance from a point of reference, in a direction perpendicular to said luminous line, and A, B and C are constants, and said sixth photo-electric cell positioned opposite the screen of the sixth cathode ray tube, receiving light therefrom and operatively connected to the grid of the first cathode ray tube, whereby a negative voltage proportional to the width of said aperture at the point occupied by said luminous line at any given instance is added to the said negative voltage impressed upon the control grid of the first cathode ray tube, and whereby the brightness of the light emitted by the screen of said first cathode ray tube is automatically modulated in accordance with the density of the elements being scanned at any given instance.

22. In a device according to claim 14, said means to convert currents passing the first photocell into voltages proportional to photographic densities comprising a sixth cathode ray tube, an apertured mask, and a sixth photo-electric cell, said sixth cathode ray tube including a screen, means to form a luminous line upon said screen and means to deflect said line, said last-named means operatively connected to the first photo-electric cell and actuated by the current passing said first photo electric cell, said apertured mask placed immediately in front of the screen of said sixth cathode ray tube, made from opaque material and having an aperture with a configuration substantially according to the formula $$Y = A \frac{X \cdot 10^{\frac{-X}{B}}}{C}$$

where Y is the width of said aperture in a direction parallel to said luminous line, X the distance from a point of reference, in a direction perpendicular to said luminous line, and A, B and C are constants, and said sixth photo-electric cell positioned opposite the screen of the sixth cathode ray tube, receiving light therefrom and operatively connected to the grid of the first cathode ray tube, whereby a negative voltage proportional to the width of said aperture at the point occupied by said luminous line at any given instance is added to the said negative voltage impressed upon the control grid of the first cathode ray tube, and whereby the brightness of the light emitted by the screen of said first cathode ray tube is automatically modulated in accordance with the density of the element being scanned at any given instance.

23. In a device according to claim 13, said means to convert, during the first operation described currents passing the first photocell into voltages proportional to photographic densities comprising a sixth cathode ray tube, an apertured mask, and a sixth photo-electric cell, said sixth cathode ray tube including a screen, means to form a luminous line upon said screen and means to deflect said line, said last-named means operatively connected to the first photo-electric cell and actuated by the current passing said first photo-electric cell, said apertured mask placed immediately in front of the screen of said sixth cathode ray tube, made from opaque material and having an aperture with a configuration substantially according to the equation $$Y = A \cdot \frac{X \cdot 10^{\frac{-X}{B}}}{C}$$

where Y is the width of said aperture in a direction parallel to said luminous line, X the distance from a point of reference, in a direction perpendicular to said luminous line, and A, B, and C are constants, and said sixth photo-electric cell positioned opposite the screen of the sixth cathode ray tube, receiving light therefrom and operatively connected during the first operation to the grid of the first cathode ray tube, whereby a negative voltage proportional to the width of said aperture at the point occupied by said luminous line at any given instance is added to the said negative voltage impressed upon the control grid of the first cathode ray tube during the first operation, and whereby, during the first operation described the brightness of the light emitted by the screen of said first cathode ray tube is automatically modulated in accordance with the density of the element being scanned at any given instance, said means to convert, during the second operation described the played back voltages, after they have been corrected by the manually adjustable devices enumerated into grid bias voltages, comprising means to generate a voltage which is the difference between one of the corrected voltages just mentioned, and the corresponding uncorrected voltage, a seventh cathode ray tube, an apertured mask, and a seventh photo-electric cell, said seventh cathode ray tube comprising a screen, means to form a luminous line upon said screen, and means to deflect said line, said last-named means operatively connected to said voltage difference, said apertured mask being opaque, placed in front of said screen, and having an aperture substantially according to the equation $$Y = F \cdot 10^{-x}$$

where Y is the width of said aperture in a direction parallel to said luminous line, X the distance in a direction perpendicular to said luminous line from a point of reference and F is a constant, said seventh photo-electric cell positioned opposite the screen of said seventh cathode ray tube, and adapted to receive therefrom an amount of light proportional to the width of said aperture at a place to which the luminous line is deflected by said voltage difference at any given instance, whereby, during the second operation described the current passing said seventh photo-cell is rendered proportional to the voltage by which the grid bias of the first cathode ray tube is to be increased or decreased.

24. In a device according to claim 14, said means to convert, during the first operation described, currents passing the first photocell into voltages proportional to photographic densities comprising a sixth cathode ray tube, an apertured mask, and a sixth photo-electric cell, said sixth cathode ray tube including a screen, means to form a luminous line upon said screen and means to deflect said line, said last-named means operatively connected to the first photo-electric cell and actuated by the current passing said first photo-electric cell, said apertured mask placed immediately in front of the screen of said sixth cathode ray tube, made from apaque material and having an aperture with a configuration substantially according to the equation $$Y = A \frac{X \cdot 10^{\frac{-X}{B}}}{C}$$

where Y is the width of said aperture in a direction parallel to said luminous line, X the distance from a point of reference, in a direction perpendicular to said luminous line, and A, B and C are constants, and said sixth photo-electric cell positioned opposite the screen of the sixth cathode ray tube, receiving light therefrom and operatively connected during the first operation to the grid of the first cathode ray tube, whereby a negative voltage proportional to the width of said aperture at the point occupied by said luminous line at any given instance is added to the said negative voltage impressed upon the control grid of the first cathode ray tube during the first operation, and whereby, during the first operation described the brightness of the light emitted by the screen of said first cathode ray tube is automatically modulated in accordance with the density of the element being scanned at any given instance, said means to convert, during the second operation described the played back voltages, after they have been corrected by the manually adjustable devices enumerated into grid bias voltages, comprising means to generate a voltage which is the difference between one of the corrected voltages just mentioned, and the corresponding uncorrected voltage, a seventh cathode ray tube, an apertured mask, and a seventh photo-electric cell, said seventh cathode ray tube comprising a screen, means to form a luminous line upon said screen, and means to deflect said line, said last-named means operatively connected to said voltage difference, said apertured mask being opaque, placed in front of said screen, and having an aperture substantially according to the equation $$Y = F \cdot 10^{-X}$$

where Y is the width of said aperture in a direction parallel to said luminous line, X the distance in a direction perpendicular to said luminous line from a point of reference and F is a constant, said seventh photo-electric cell positioned opposite the screen of said seventh cathode ray tube, and adapted to receive therefrom an amount of light proportional to the width of said aperture at a place to which the luminous line is deflected by said voltage difference at any given instance, whereby, during the second operation described the current passing said seventh photocell is rendered proportional to the voltage by which the grid bias of the first cathode tube is to be increased or decreased.

25. In a device according to claim 13, means to adjust this device, comprising means to record three voltages representing photographic densities, these means being additional to the recording means mentioned, means to use one of the recording means to record voltages representing densities to light of three primary colors respectively of a first colored transparency, means to use the other of said recording means to record voltages representing densities to light of three primary colors respectively of a second colored transparency, said second transparency being obtained by photographing a colored print made from said first transparency, means to play back the voltages recorded on said additional recording means mentioned in this claim, simultaneously with the voltages recorded on the other recording means mentioned, three indicating cathode ray tubes distinct from and additional to, all other cathode ray tubes used in this device, each comprising a screen, means to generate a luminous point upon said screen, and two means disposed at right angles with each other, to deflect said point, the first of said deflecting means of each tube operatively connected to one of the played back voltages representing the photographic density to light of one primary color of the first transparency, the second of said deflecting means of each tube operatively connected to one of the played back voltages representing the photographic density, as corrected by the operator by the other means enumerated to light of the same primary color of the second transparency, whereby each indicating cathode ray tube on its screen displays a luminous figure that represents the corrected photographic densities to light of the second three primary colors respectively of the second transparency as a function of the corresponding original densities of the first transparency.

26. In a device according to claim 14, means to adjust the device for best results, comprising means to record three voltages representing photographic densities, these means being additional to the recording means mentioned, means to use one of the recording means to record voltage representing densities to light of three primary colors respectively of a first colored transparency, means to use the other of said recording means to record voltages representing densities to light of three primary colors respectively of a second colored transparency, said second transparency being obtained by photographing a colored print made from said first transparency, means to play back the voltages recorded on said additional recording means simultaneously with the voltages recorded on the recording means mentioned, three indicating cathode ray tubes distinct from and additional to, all other cathode ray tubes used in this device, each comprising a screen, means to generate a luminous point upon said screen, and two means disposed at right angles with each other, to deflect said point, the first of said deflecting means of each tube operatively connected to one of the played back voltages representing the photographic density to light of one primary color of the first transparency, the second of said deflecting means of each tube operatively connected to one of the played back voltages representing the photographic density, as corrected by the operator by the means enumerated, to light of the same primary color of the second transparency, whereby each indicating cathode ray tube on its screen displays a luminous figure that represents the corrected photographic densities to light of the three primary colors respectively of the second transparency as a function of the corresponding original densities of the first transparency.

27. A device for making photographic color prints comprising a cathode ray tube, including a screen, means to generate a moving substantially white luminous spot upon said screen and a grid controlling the current passing said tube and thereby the intensity of the light emitted by said spot, means supporting a colored transparency in front of said screen adapted to be scanned by said spot in a televisionlike manner, a set of three filters in three primary colors respectively including means to place said filters consecutively, one at a time, into the path of the light passing said transparency, a photo-electric cell, means supporting a sensitized sheet, means to direct light transmitted by said transparency either into said photocell or upon said sensitized sheet, said last-named means including means forming an image of said transparency upon said sheet, means operative when said light is directed into said photocell, to convert the currents passing said photocell into voltages proportional to photographic densities, and to record said voltages, including means to repeat this process when each of said three filters is placed into the path of said light, means, operative when said light is directed upon said sensitized sheet, to modulate the grid bias of said cathode ray by the means set forth below, including means to play back simultaneously said three previously obtained records, means adjustable by the operator and adapted to modify said played back voltages, means to convert the three played back voltages thus corrected into grid bias voltages, and means to impress one of said grid bias voltages upon the grid of said cathode ray tube whereby said device is adapted to perform two separate and consecutive operations, during the first operation the light of the cathode ray tube being directed into said photocell said photocell currents being converted into voltages proportional to photographic densities, and said voltages representing densities to light of three primary colors being recorded, during the second operation the light of said cathode ray tube being directed upon said sensitized sheet, the recorded three voltages being played back simultaneously and, after being adjusted by the operator, and the current passing said cathode tube being modulated by one of the grid voltages thus obtained.

28. A device for making photographic color prints comprising a cathode ray tube, including a screen, means to generate a moving luminous spot upon said screen and a grid controlling the current passing said tube and thereby the intensity of the light emitted by said spot, means supporting a set of separation negatives, one at a time, in front of said screen, said negative adapted to be scanned by said spot in a televisionlike manner, a photo-electric cell, means supporting a sensitized sheet, means to direct light transmitted by said negative either into said photocell or upon said sensitized sheet, said last-named means including means forming an image of said negative upon said sheet, means, operative when said light is directed into said photocell, to convert the currents passing said photocell into voltages proportional to photographic densities, and to record said voltages, including means to repeat this process when each of said three separation negatives is placed in front of said screen, means, operative when said light is directed upon said sensitized sheet, to modulate the grid bias of said cathode ray by the means set forth below, including means to play back simultaneously said three previously obtained records, means adjustable by the operator and adapted to modify said played back voltages, means to convert the three played back voltages thus corrected into grid bias voltages, and means to impress one of said grid bias voltages upon the grid of said cathode ray tube whereby said device is adapted to perform two separate and consecutive operations, during the first operation the light of the cathode ray tube being directed into said photocell said photocell currents being converted into voltages proportional to photographic densities, and said voltages representing densities to light of three primary colors being recorded, during the second operation the light of said cathode ray tube being directed upon said sensitized sheet, the recorded three voltages being played back simultaneously and, after being adjusted by the operator, and the current passing said cathode tube being modulated by one of the grid voltages thus obtained.

ALFRED SIMMON.

No references cited.